United States Patent
Perry et al.

[15] 3,650,018
[45] Mar. 21, 1972

[54] MACHINE TOOL WITH TOOL CHANGING AND TRANSFERRING MEANS

[72] Inventors: Charles B. Perry; Lawrence A. Attermeyer, both of Cincinnati, Ohio

[73] Assignee: Cincinnati Milacron Inc., Cincinnati, Ohio

[22] Filed: Aug. 6, 1970

[21] Appl. No.: 61,870

Related U.S. Application Data

[63] Continuation of Ser. No. 690,942, Dec. 15, 1967, abandoned.

[52] U.S. Cl. ...........................................................29/568
[51] Int. Cl. .....................................................B23q 3/157
[58] Field of Search ............................................29/568

[56] References Cited

UNITED STATES PATENTS 3,286,595   11/1966   Wollenhaupt.....................29/568 X Primary Examiner—Francis S. Husar
Attorney—Norman S. Blodgett

[57] ABSTRACT

This invention relates to a machine tool and, more particularly, to apparatus for use in a manufacturing plant having in storage a number of tool modules which can be attached to and operated by a spindle, the particular module being selected in accordance with the character of a particular workpiece presented to the apparatus.

14 Claims, 39 Drawing Figures

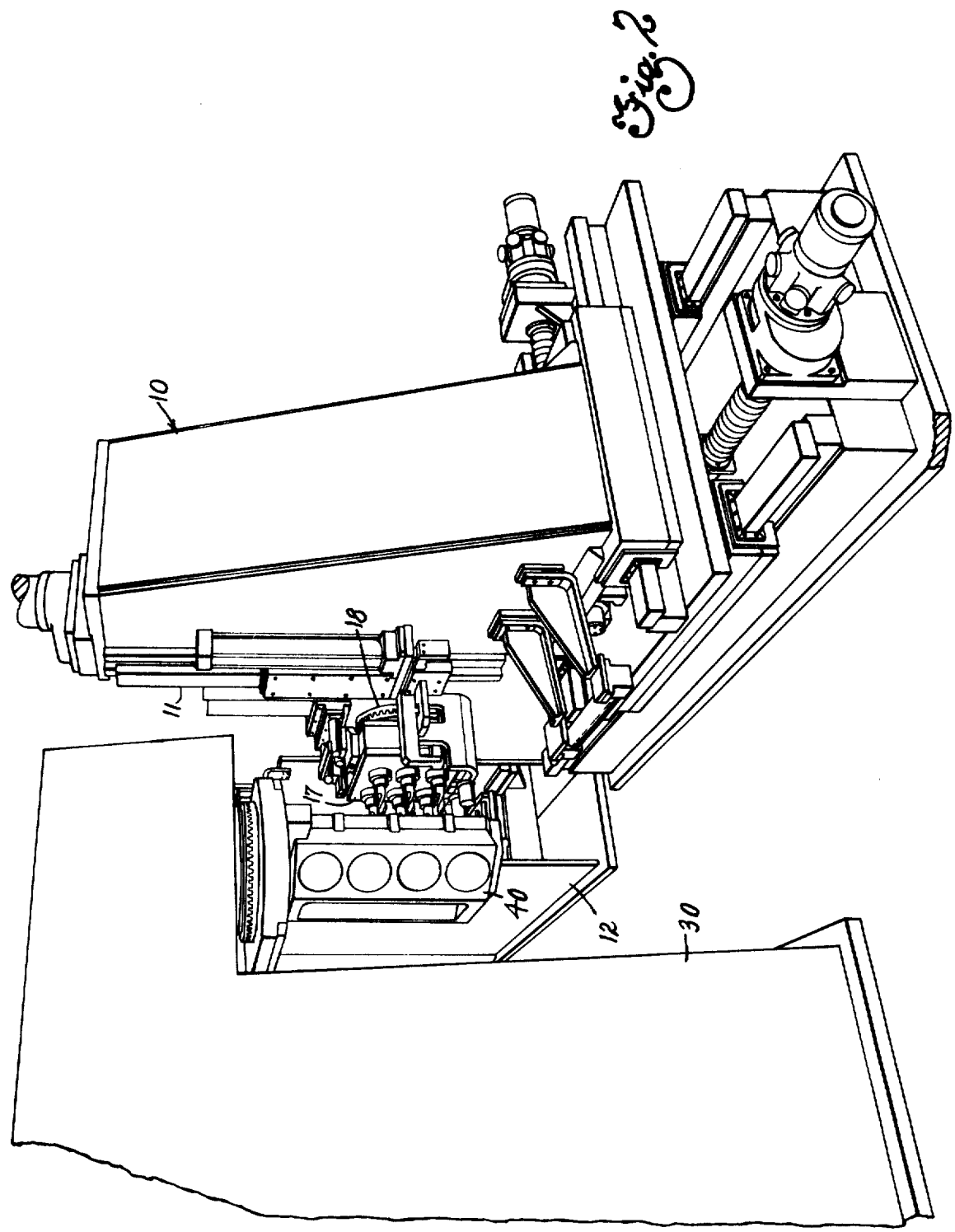

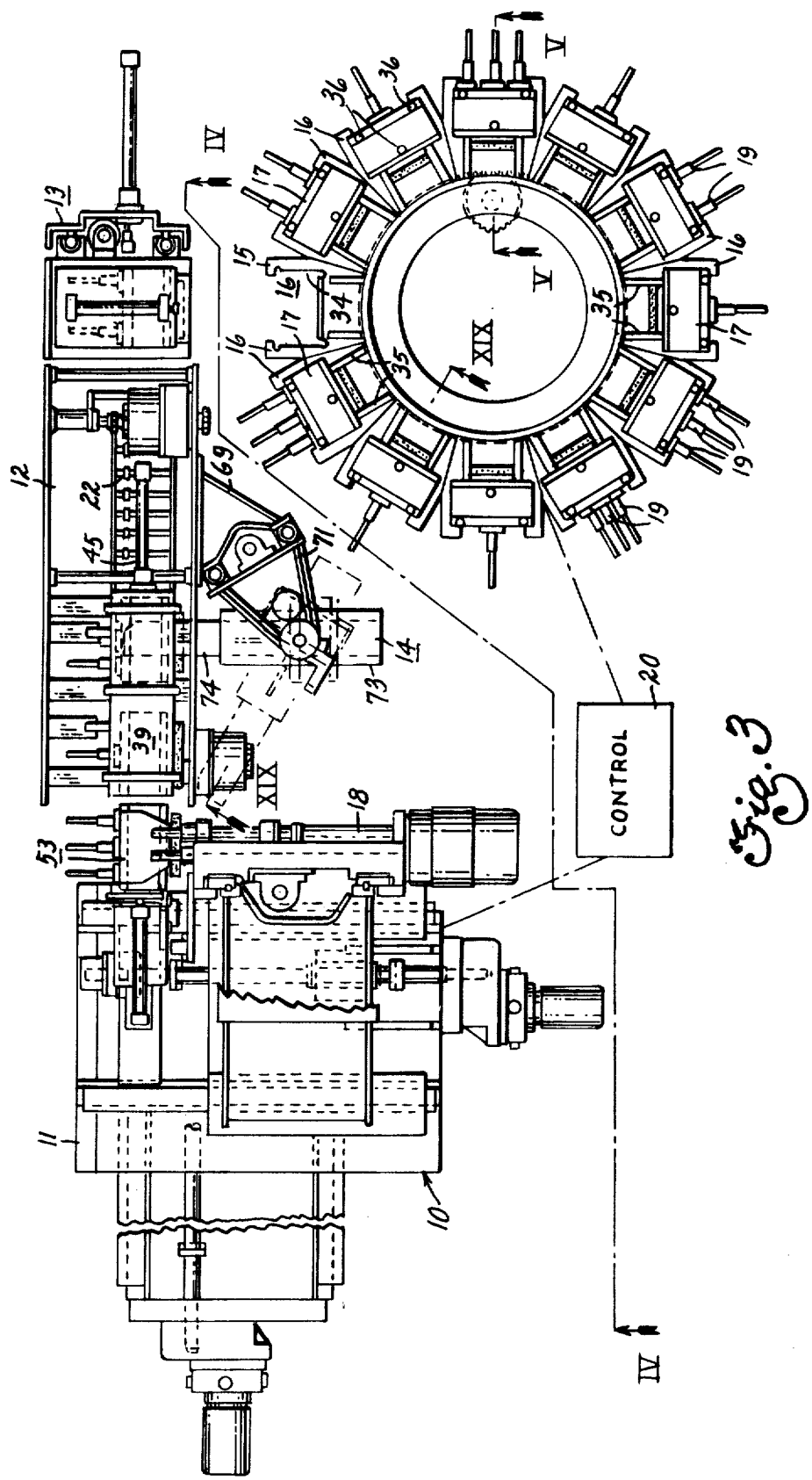

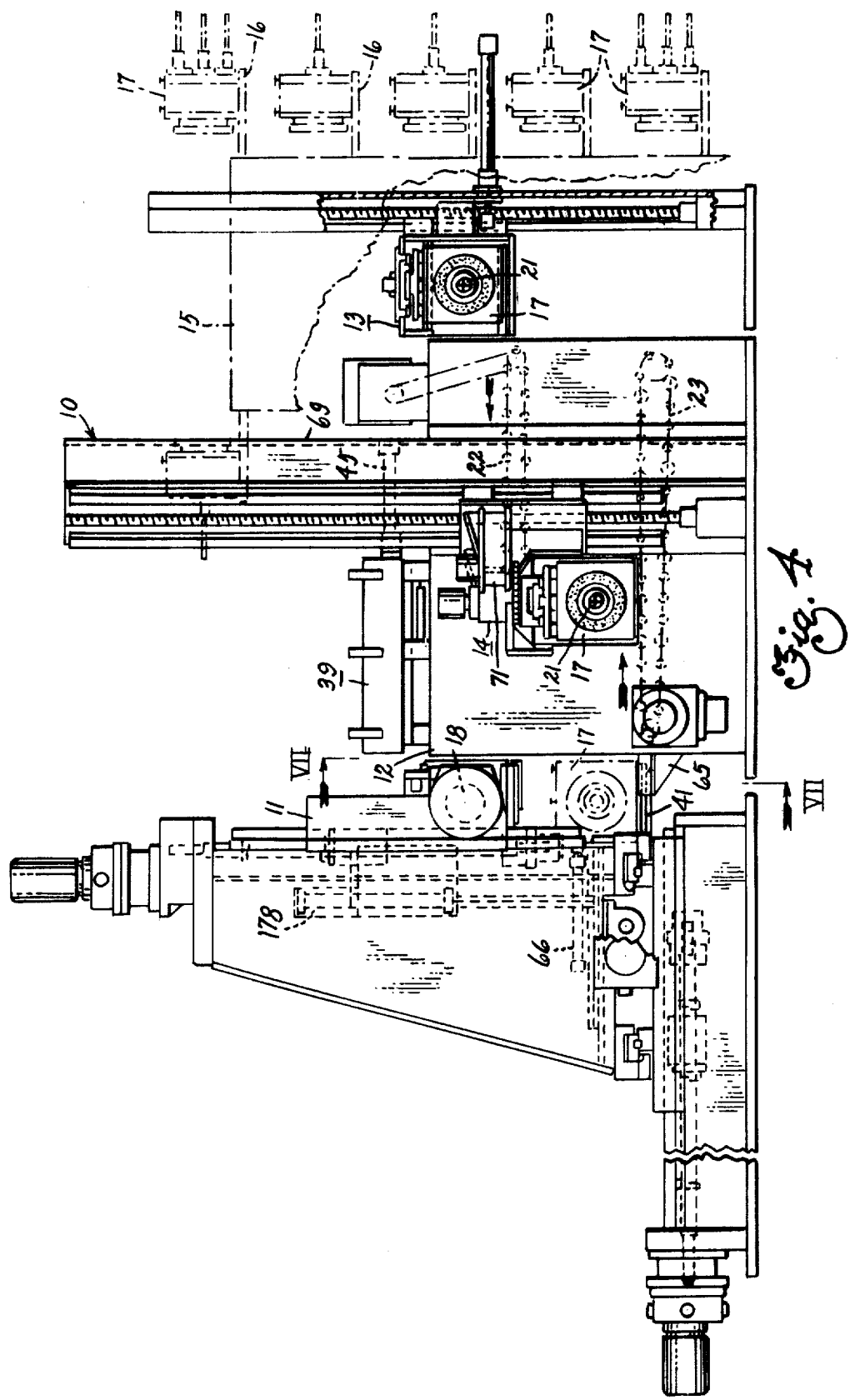

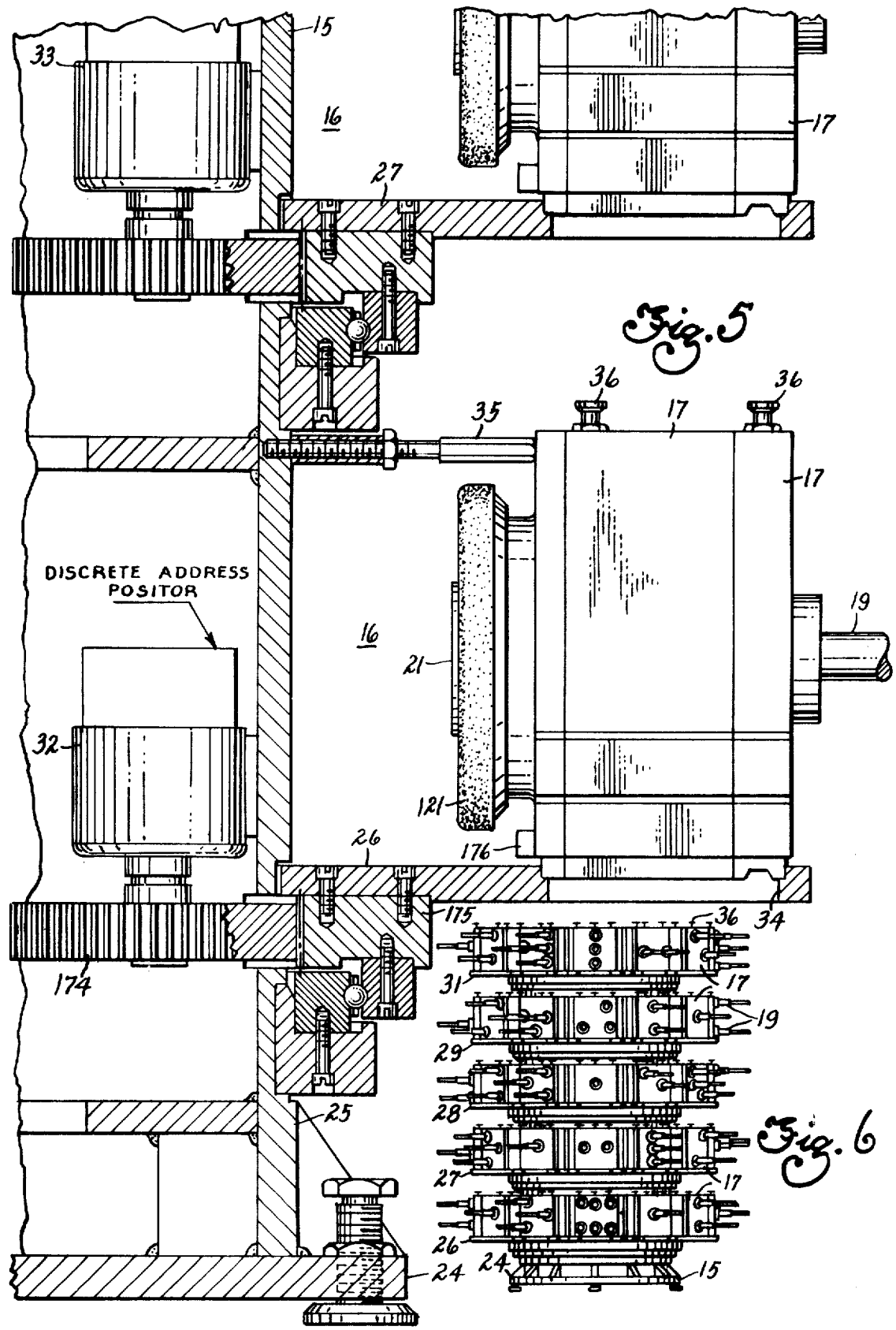

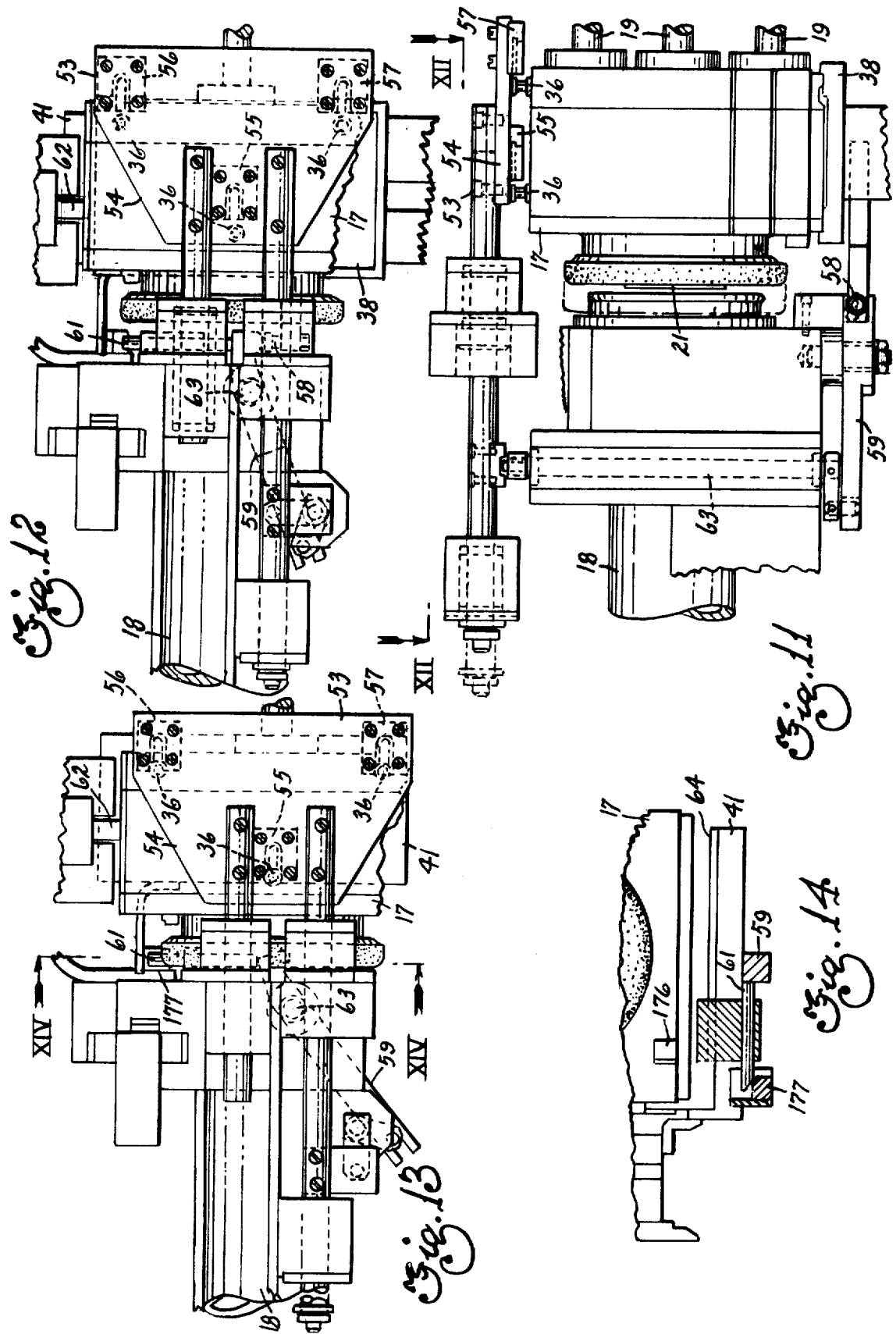

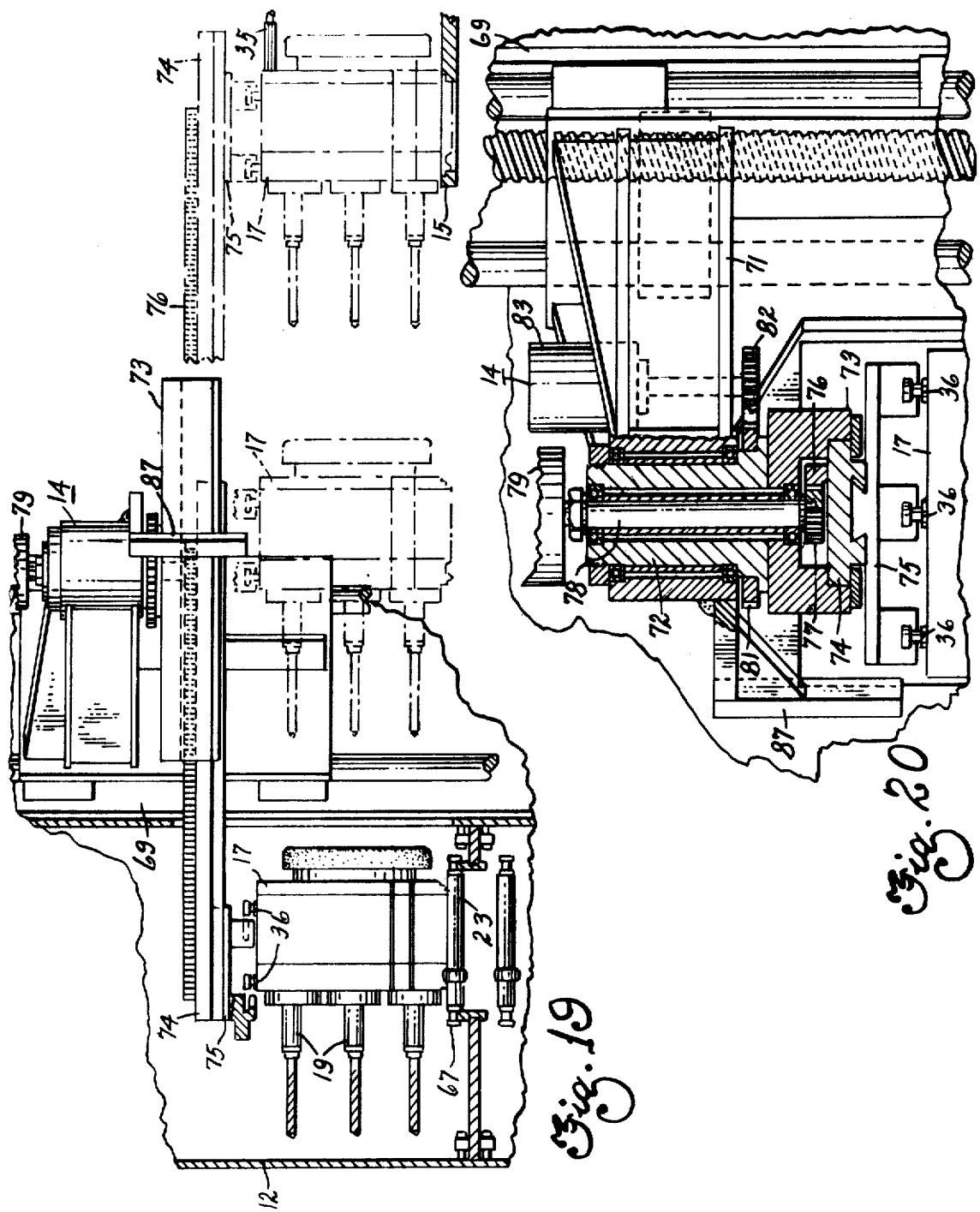

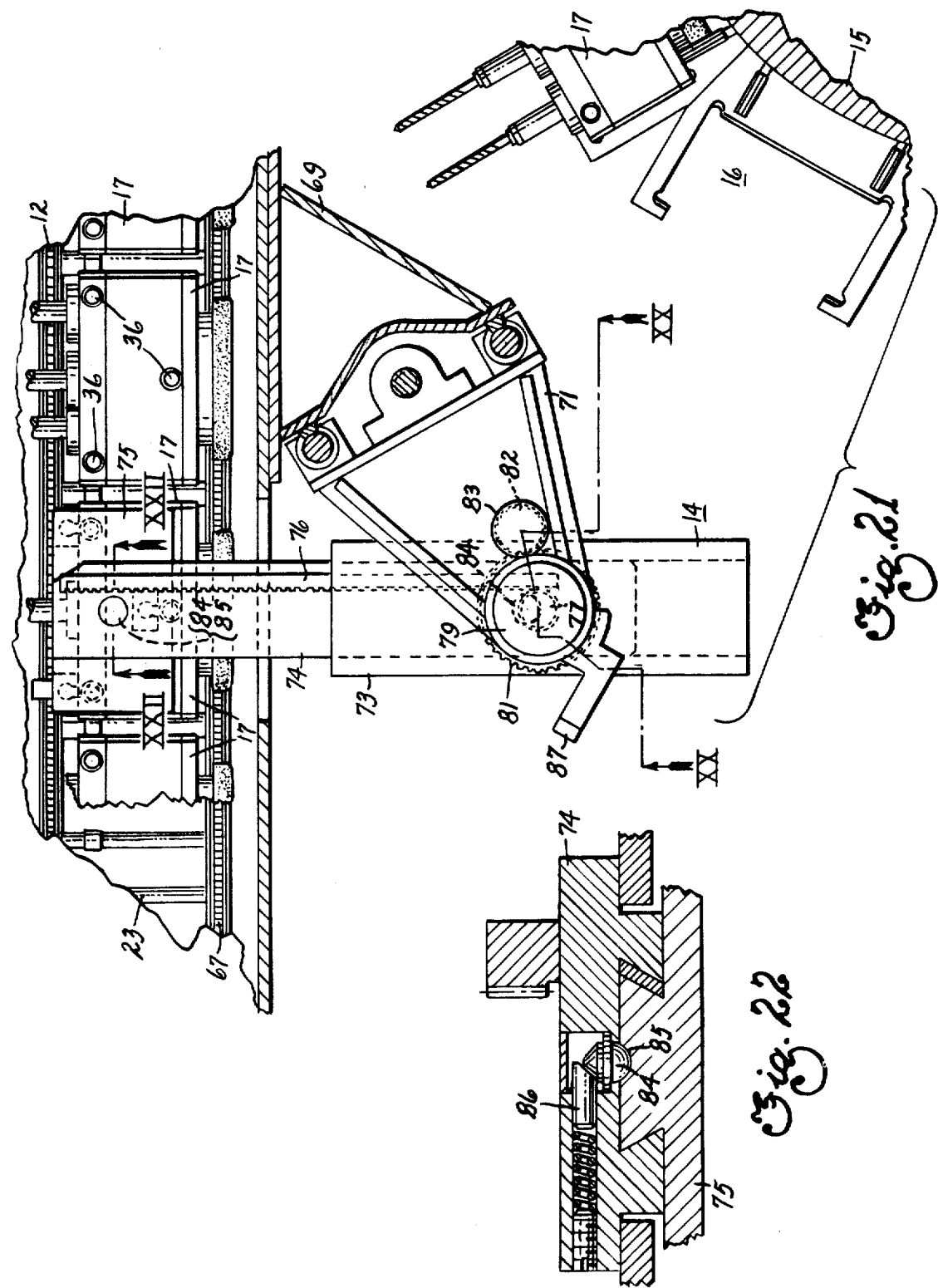

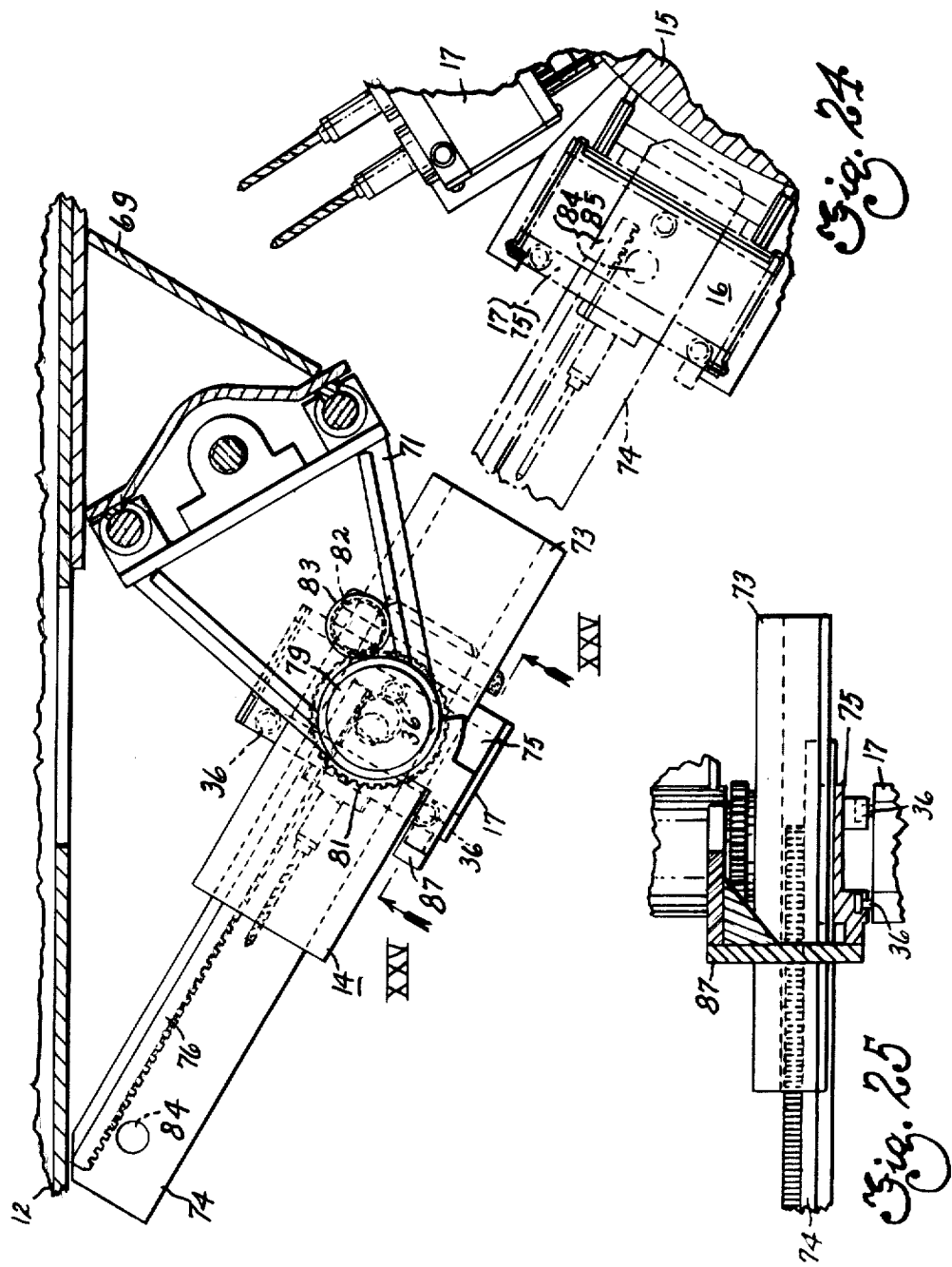

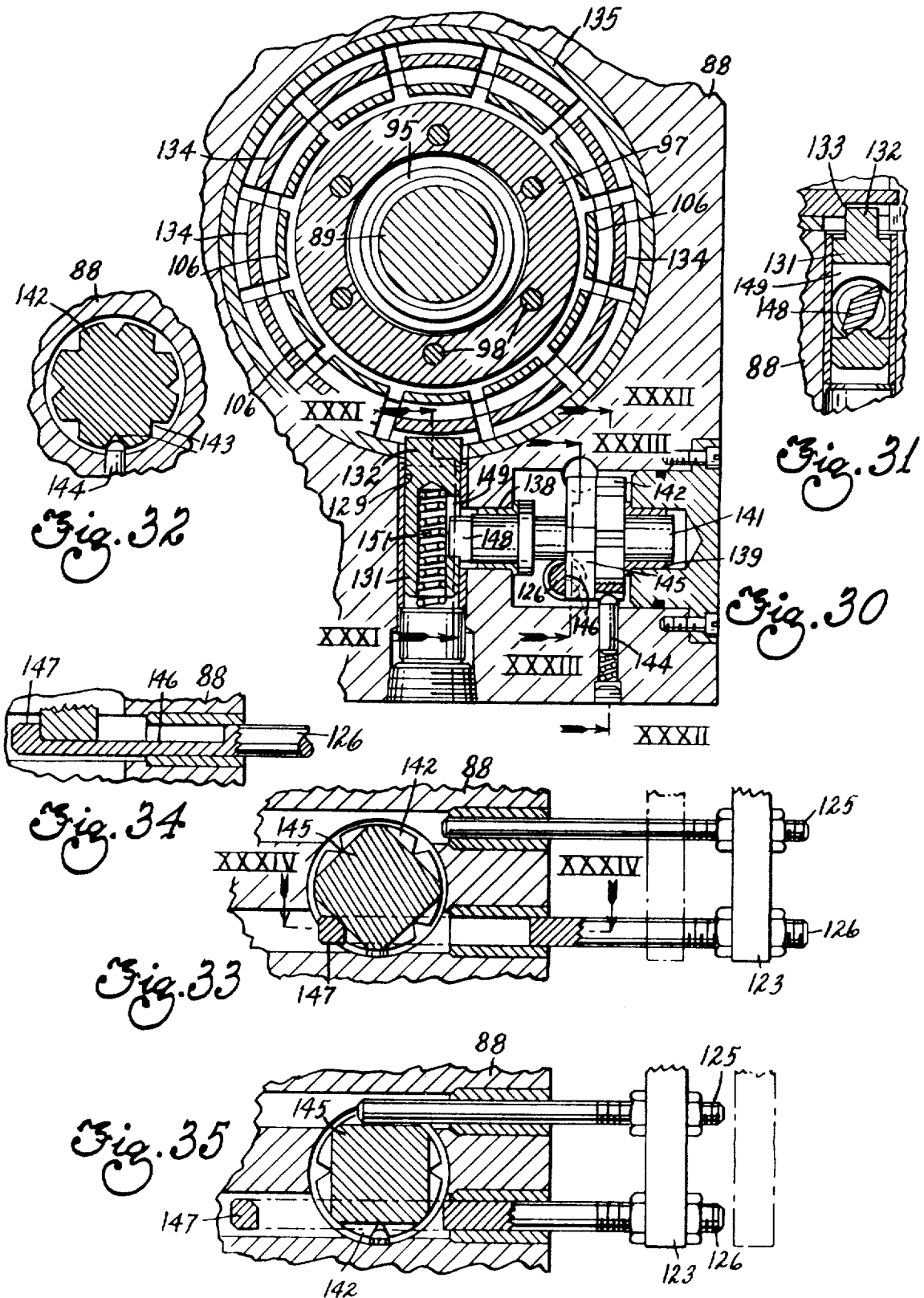

3,650,018

MACHINE TOOL WITH TOOL CHANGING AND TRANSFERRING MEANS

REFERENCE TO COPENDING APPLICATION

This application is a continuation of patent application Ser. No. 690,942, filed Dec. 15, 1967, now abandoned.

BACKGROUND OF THE INVENTION

In the operation of a manufacturing plant which processes a large number of different workpieces, it has been common practice to use two general types of machine tools. The first type is the machine tool which performs a very special operation, but does it very well; in general, such a machine tool can be very rugged and inexpensive and very often has high horsepower capability. An example of such a tool is a face-milling machine. Although it lacks versatility, usually the workpiece "mix" will be such that there is plenty of work for it to do and it is kept busy. The second type is the machine tool that can perform almost any machining operation, but is quite expensive and inefficient in performing any one of its functions; an example of such a machine tool is the single-spindle machine with tool storage and changing capability.

Very often, however, in a manufacturing plant a particular workpiece will appear upon which a number of relatively light machining operations are to be performed. If such a workpiece is sent to the first type of machine tool (special purpose), it is quite likely that it cannot perform any of the desired operations. If it is sent to the second type of machine tool (versatile), it will perform all of the operations, but it will do them one at a time and will tie up the machine for a considerable period of time; since this machine is very expensive, we are presented with an uneconomical use of capital. Attempts to solve this dilemma with workpieces having a large number of parallel holes by the use of multiple spindle machine tools have not been entirely successful because of variations in center distances of the holes for different workpieces. These and other difficulties experienced with the prior art devices have been obviated in a novel manner by the present invention.

It is, therefore, an outstanding object of the invention to provide a machine tool that combines good versatility with efficient operation.

Another object of this invention is the provision of a machine tool that is capable of performing a plurality of light-duty machining operations on any one of a large number of different workpieces.

A further object of the present invention is the provision of a machine tool for performing multispindle machining operations simultaneously on a workpiece and, after completing them, can be quickly converted to performing a different set of such operations on another workpiece.

It is another object of the instant invention to provide a machine tool with tool-changing capability which combines the advantages of random tool storage with ordered tool storage.

A still further object of the invention is the provision of a machine tool having a tool changer capable of operating with extremely heavy tools.

It is a further object of the invention to provide a machine tool having a magazine for the random storage of tools, wherein a tool may be removed for use at the same time that another tool is being reintroduced for storage.

Another object of this invention is the provision of a machine tool having a large tool storage capacity combined with rapid tool-changing capability.

A further object of the invention is to provide a machine tool having a small tool storage facility close to the spindle to permit rapid tool change and a large tool storage facility remote from the spindle to permit leisurely retrieval of tools for ultimate transfer to the spindle.

It is another object of the invention to provide a machine tool with tool-changing capability and having large-capacity random storage combined with small-capacity ordered storage.

A further object of the invention is the provision of a machine tool with tool-changing capability in which the cycle of nonproductive operation is maintained at a minimum.

A still further object of the invention is to provide a machine tool with tool-changing capability in which means is provided to locate successive tools very accurately relative to the spindle axis for good repeatability and control of machining operations.

With these and other objects in view, as will be apparent to those skilled in the art, the invention resides in the combination of parts set forth in the specification and covered by the claims appended hereto.

SUMMARY OF THE INVENTION

In general, the present invention has to do with a machine tool having a housing with a rotatable spindle, having a storage magazine with a plurality of compartments, having a plurality of tool modules adapted to be stored in the compartments, each module having tool spindles extending in one direction and an input drive shaft extending in another direction, and having means for transferring a module from a compartment of the storage magazine to the spindle and subsequently returning it to the magazine. This machine tool is particularly intended for use in a manufacturing system such as is described in the patent application of Carl Perry, Ser. No. 690,940, filed Dec. 15, 1967. Furthermore, means is provided at the spindle for supporting the module without rotation, for advancing it in the direction of rotating the input shaft for rotation of the tool spindles.

Also, the machine tool provides for large-capacity random storage of tools in the magazine (which is remote from the spindle) and it is provided with a queue line of small storage capacity close to the spindle for the ordered storage of tools. Separate means transfers the tool from the compartment to the queue line on the one hand and from the queue line to the spindle on the other hand.

An important part of the invention relates to the provision of means operative on occasion to inhibit the transfer of new tools to the queue line and to convey an old tool which has just been used at the spindle to the end of the queue line; according to a preferred form of the invention, the old tool is transferred from the spindle back to the magazine and immediately from the magazine to the queue line by suitable transfer means.

The storage magazine consists of a vertical pivot with a plurality of disks mounted one above the other for independent rotation about the pivot. Each disk has a plurality of compartments located on its periphery for the storage of tools. Now, the machine tool has a first transfer means located at a first position adjacent the magazine to convey a tool from a compartment for use at the spindle and a second transfer means located at a second position adjacent the magazine; then, means is provided to rotate a disk and locate at the first position a compartment which contains a tool to be advanced next to the spindle and to locate at the second position an empty compartment of another disk to receive a tool that is about to be received from the spindle by the second transfer means.

Electronic data processing means retains the information as to the particular empty compartment to which a particular tool is returned and uses that information later to transfer the tool again to the spindle. As a matter of fact, the electronic data processing means contains at a given time the exact information as to the whereabouts of every tool associated with the machine tool.

The machine tool is provided with a mechanism to advance the tool toward a workpiece and for connecting the tool to the spindle during the advance; this mechanism includes a rugged but inaccurate torque-transmitting coupling and a separate but accurate coupling for locating the tool axis relative to the spindle axis. The locating coupling consists of a circular array of complementary teeth on both spindle housing and tool module.

BRIEF DESCRIPTION OF THE DRAWINGS

The character of the invention, however, may be best understood by reference to one of its structural forms, as illustrated by the accompanying drawings, in which:

FIG. 2 is another perspective view of the machine tool, FIG. 3 is a plan view of the machine tool, FIG. 4 is a rear elevational view of the machine tool taken on the line IV—IV of FIG. 3, FIG. 5 is a vertical sectional view taken on the line V—V of FIG. 3 of a storage magazine forming a part of the machine tool, FIG. 6 is a elevational view of the storage magazine.

FIG. 11 is a vertical sectional view of the invention taken on the line XI—XI of FIG. 8.

FIGS. 12 and 13 are horizontal sectional views of a portion of the invention taken on the line XII—XII of FIG. 11, showing two conditions of the parts, FIG. 14 is a vertical sectional view of the invention taken on the line XIV—XIV of FIG. 13, FIG. 19 is a vertical sectional view of a transfer mechanism, showing the return of a tool module to the storage magazine, taken on the line XIX—XIX of FIG. 3, FIG. 20 is a vertical sectional view through the transfer mechanism taken on the line XX—XX of FIG. 21, FIG. 21 is a plan view of the transfer mechanism, FIG. 22 is a vertical sectional view of the mechanism taken on the line XXII—XXII of FIG. 21, FIG. 24 is a plan view of the transfer mechanism showing it in a still further condition, FIG. 25 is a vertical sectional view taken on the line XXV—XXV of FIG. 24, FIG. 30 is a transverse sectional view of the spindle taken on the line XXX—XXX of FIG. 26, FIG. 31 is a vertical sectional view taken on the line XXXI—XXXI of FIG. 30, FIG. 32 is a vertical sectional view taken on the line XXXII—XXXII of FIG. 30, FIG. 33 is a vertical sectional view taken on the line XXXIII—XXXIII of FIG. 30, FIG. 34 is a horizontal sectional view taken on the line XXXIV—XXXIV of FIG. 33, FIG. 35 is a view similar to FIG. 33, but with parts in another condition.

DESCRIPTION OF THE PREFERRED EMBODIMENT

Figure 1:
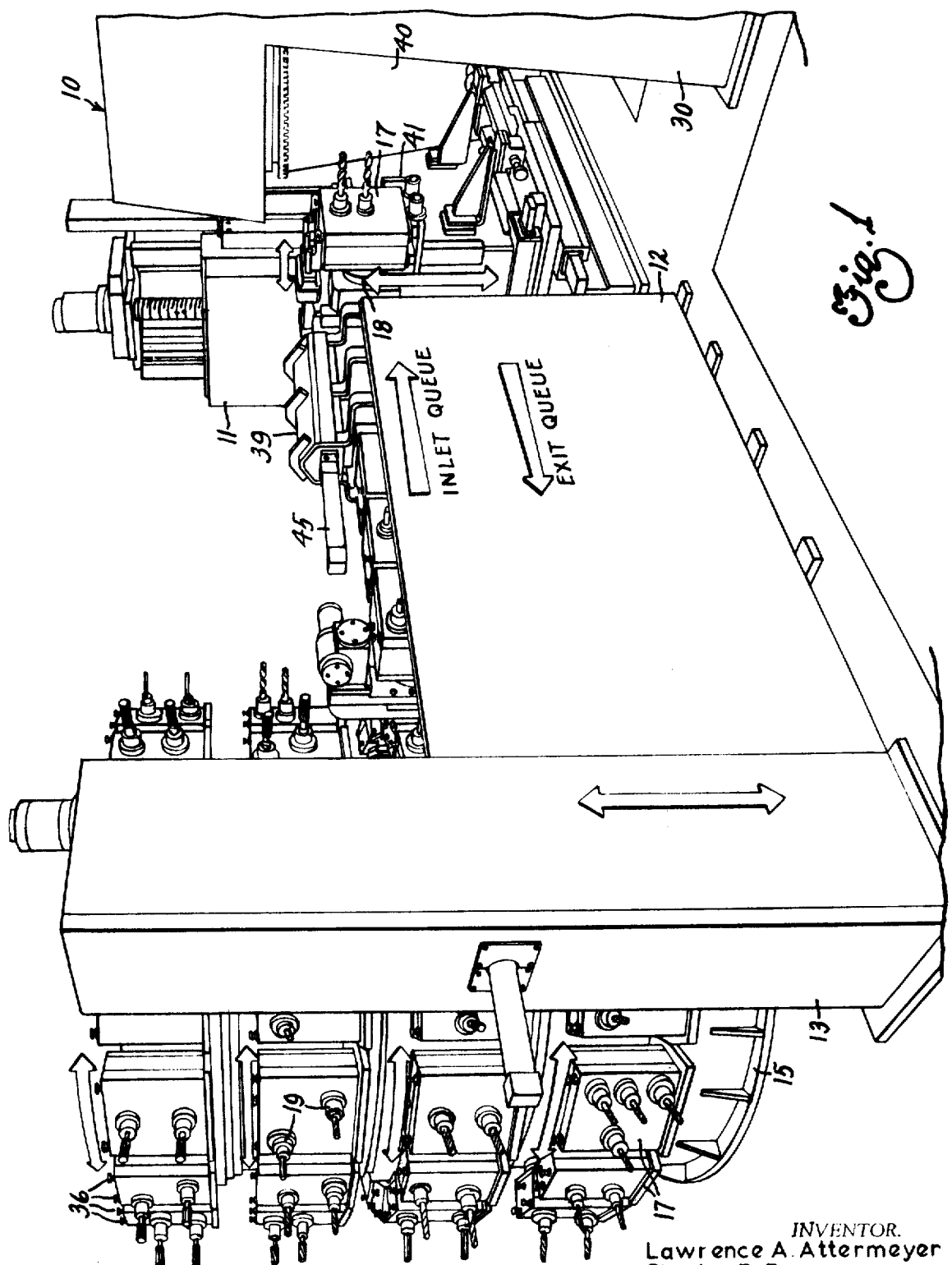
FIG. 1 is a perspective view of a machine tool embodying the principles of the present invention.

Referring first to FIGS. 1 through 4, which best show the general features of the invention, the machine tool, indicated generally by the reference numeral 10, is shown as consisting of a housing 11, a queue storage mechanism 12, an input transfer mechanism 13, an output transfer mechanism 14, a storage magazine 15, and a control 20, including a electronic data processing apparatus. The magazine is provided with a plurality of compartments 16, each adapted to receive a tool module 17. The housing 11 has a horizontal main machine spindle 18. Each module 17 may have a plurality of tool spindles 19 extending from one side and an input drive shaft 21. Standing in front of the spindle 18 is a support 30 accurately supporting a workpiece 40.

Included in the queue storage mechanism 12 is an upper horizontal conveyor 22 for moving the modules 17 one-by-one to the spindle 18 and a lower horizontal conveyor 23 for moving the modules away from the spindle.

As is evident in FIGS. 5 and 6, the storage magazine 15 is provided with a base 24 having a support tube 25 providing a vertical pivot. On the tube are mounted a plurality of spaced, parallel disks 26, 27, 28, 29, and 31; these disks are capable of independent rotative movement about the pivotal axis. For instance, the disk 26 is rotated by a motor 32 and the disk 27 by a motor 33. The compartment 16 associated with the disk 26 (see FIG. 5) is provided with a socket 34 in which the module 17 rests and a stop 35. The module is provided with headed pins 36 to assist in its transportation.

Figure 7:
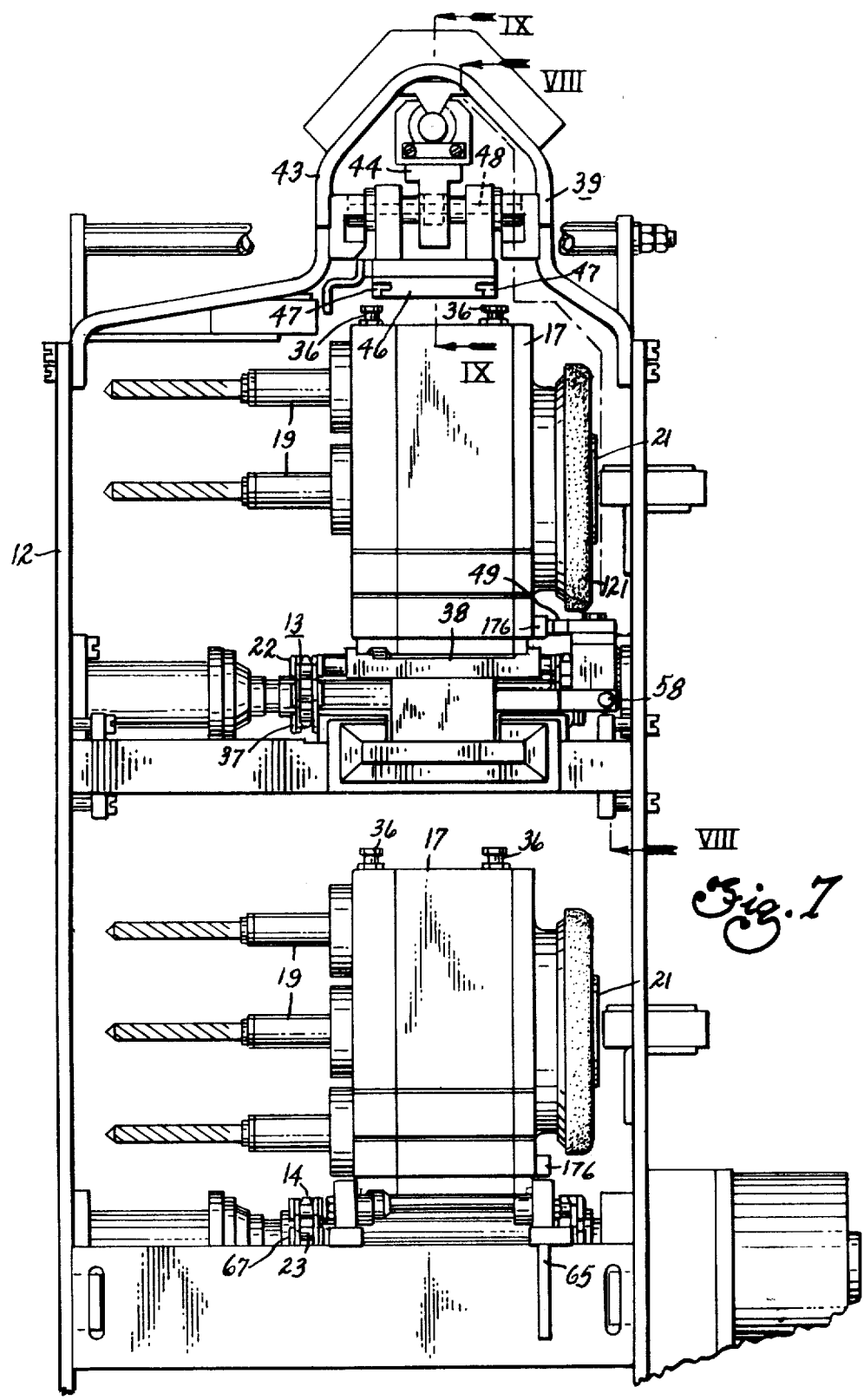
FIG. 7 is a vertical sectional view of the machine tool taken on the line VII—VII of FIG. 4.
Figure 8:
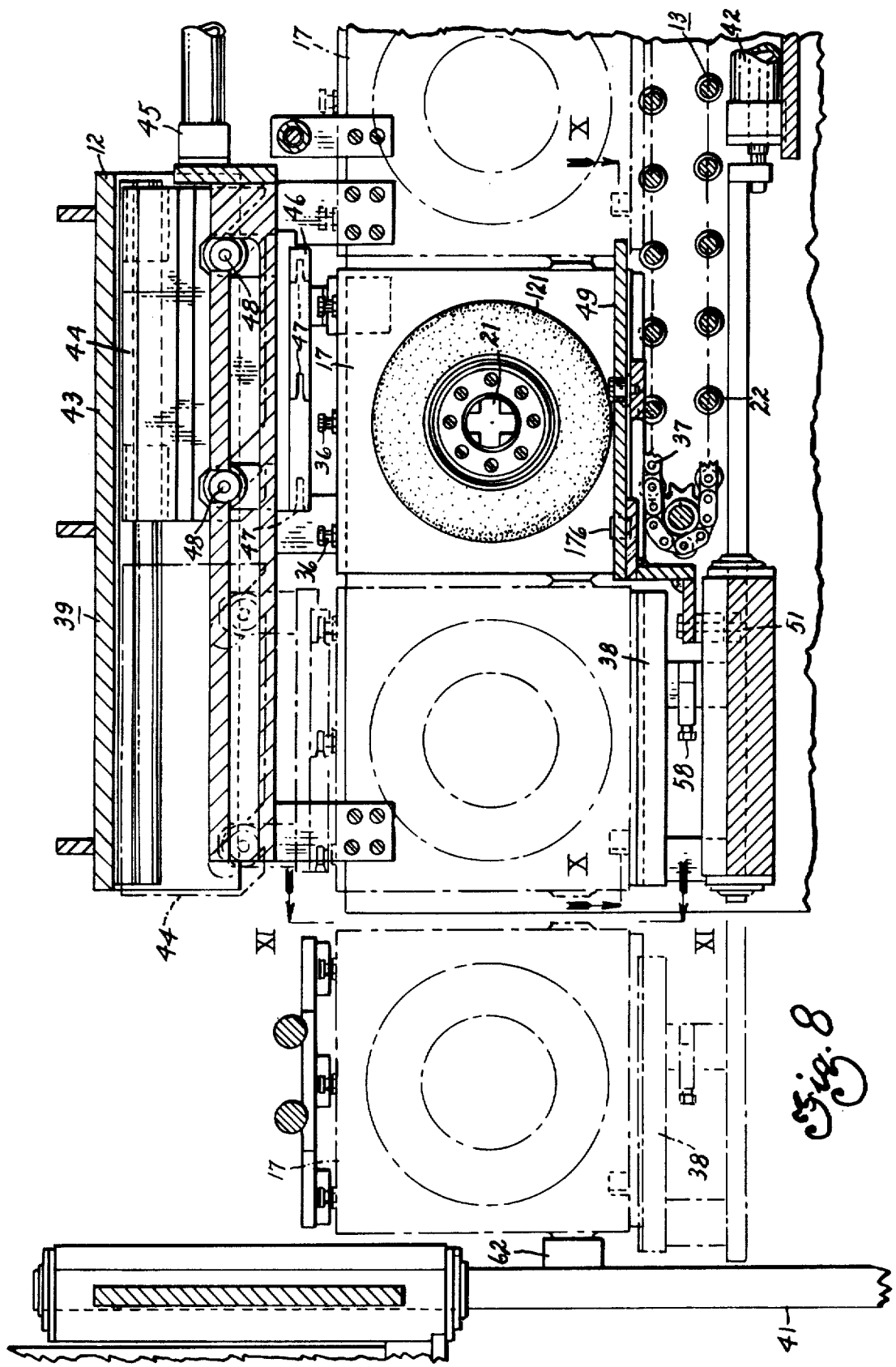
FIG. 8 is a vertical sectional view of the machine tool taken on the line VIII—VIII of FIG. 7.

FIGS. 7 and 8 show the details of the queue storage mechanism 12 including the input storage mechanism 13 and the output storage mechanism 14. The input storage consists of a chain belt 37 which terminates beside a platform 38 which, in turn, is beside the main machine spindle. An overhead tramway 39 carries the module 17 from the end of the chain belt 37 to a slidable platform 38. The platform is moved toward the spindle by a cylinder 42. An elevator 41 is provided along the vertical plane of the spindle to carry the module 17 (after use) from the spindle to the output storage mechanism 14.

Figure 9:
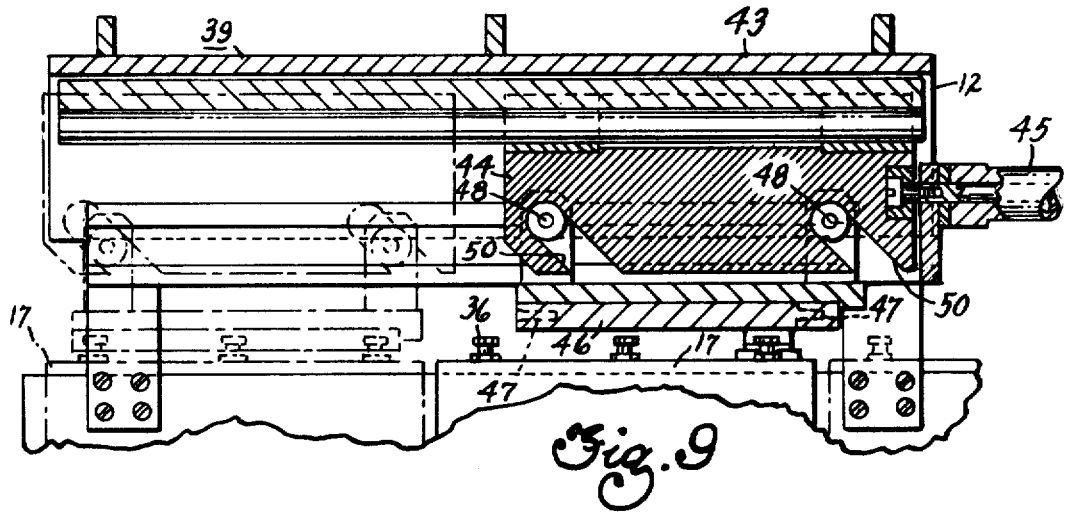
FIG. 9 is a vertical sectional view of the machine tool taken on the line IX—IX of FIG. 7.
Figure 10:
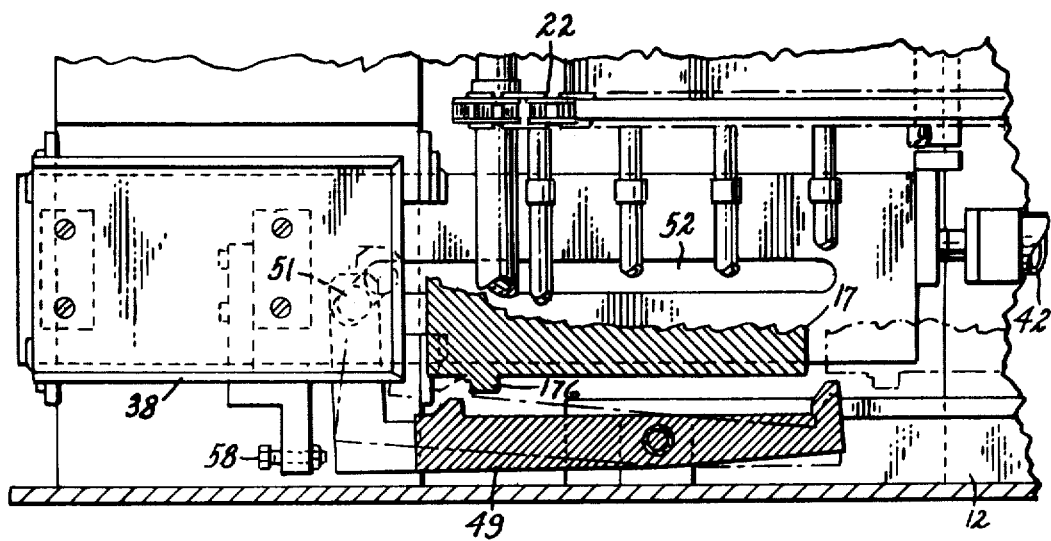
FIG. 10 is a horizontal sectional view taken on the line X—X of FIG. 8.

FIGS. 9 and 10 show the details of the equipment for transferring the modules from the chain belt 37 to the platform 38 for subsequent transfer to the spindle area. The tramway 39 consists of an overhead support 43 from which is supported a slide 44; the slide is movable in a horizontal plane under the action of an actuator 45 and from this slide is suspended a pickup plate 46. This plate has slots 47 which engage the headed pins 36. The plate is suspended from the slide 44 by means of transverse rods 48 which engage inclined slots 50 in the lower portion of the slide. An escapement lever 49 is pivotally mounted on the frame to hold back a waiting module while the preceding one is advanced by the platform 38 and the actuator 42. An extension of the escapement lever is provided with a pin 51 which engages a bayonet slot 52 formed on an extension of the platform 38. The reciprocation of the platform, therefore, causes the escapement lever to swing back-and-forth in a horizontal plane to release the modules one at a time.

Figure 15:
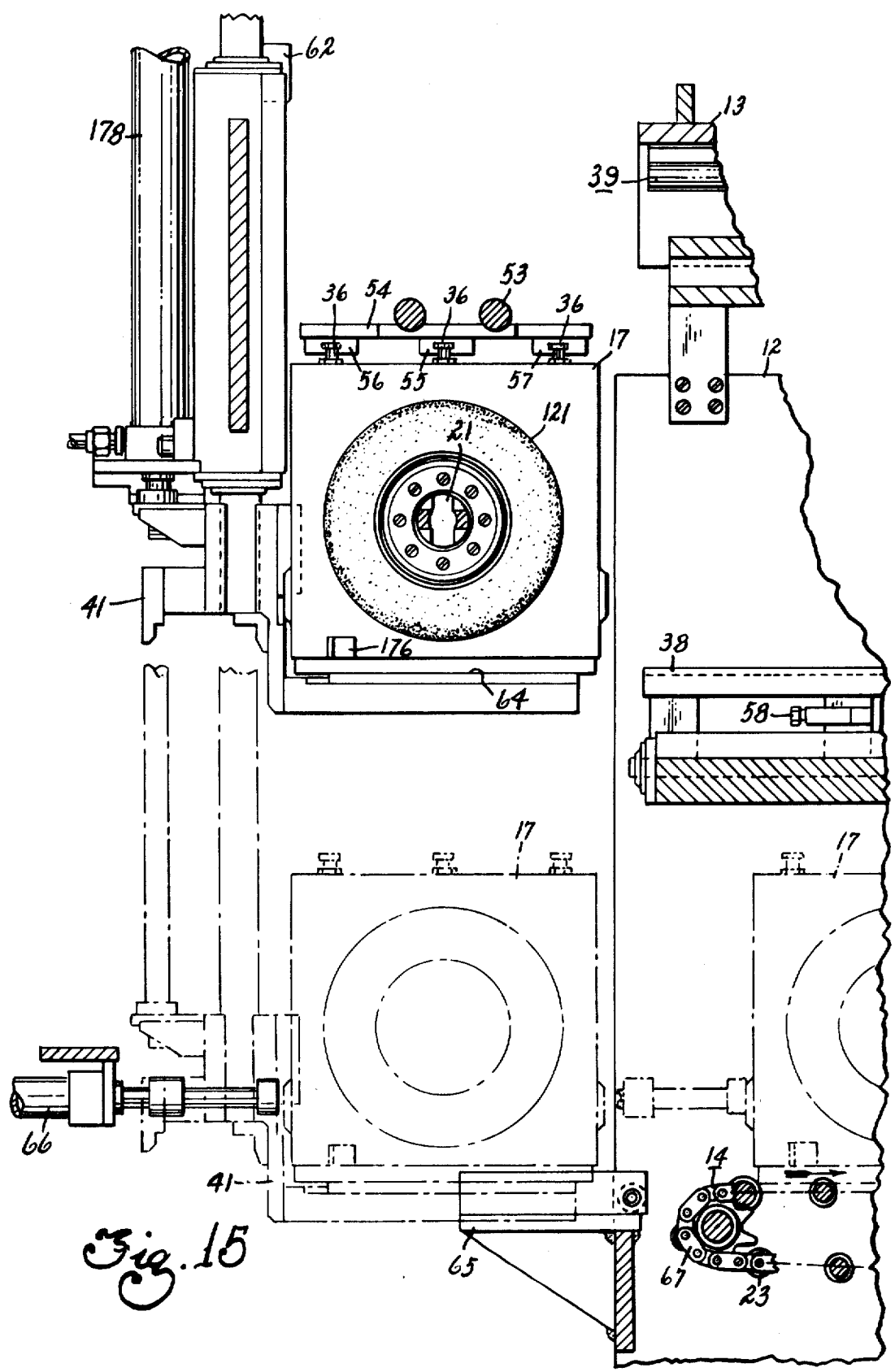
FIG. 15 is a vertical sectional view of the invention similar to FIG. 8, but with the parts in a different condition.

FIGS. 11, 12, 13, 14 and 15 show the construction and details of a hanger mechanism 53 which supports the module when the platform 38 leaves the interchange position in line with the spindle and until the spindle has made an operative, supporting connection with the module. In FIG. 11 the module 17 is shown just before it arrives in the interchange area with its input drive shaft 21 extending toward the main machine spindle 18 and with its tool spindles 19 extending in the opposite direction toward a workpiece (not shown). Forming part of the hanger mechanism 53 is a plate 54 to the bottom surface of which are attached blocks 55, 56, and 57 each of which is provided with slots adapted to receive the pins 36 on the module. Eventually, an adjustable stop 58 (see FIG. 10) strikes a lever 59; the pivoting of the lever in a horizontal plane about its axis also moves a sliding pin 61. When the platform 38 has moved across to its extreme position and the module rests against a stop 62 (see FIG. 8), the pin 61 and the lever 59 occupy the positions shown in FIG. 13. The other end of the lever 59 operates through a vertical shaft 63 (see FIG. 11) to pull the hanger mechanism 53 to the left, thus engaging the slots of the blocks 55, 56, and 57 with the headed pins 36 of the module. With the module thus suspended, the platform 38 returns to the "ready" position next to the interchange position. The spindle and module are connected together. Referring to FIG. 14, the elevator 41 moves back up and its table 64 approaches the bottom of the module; at that time, a bracket on the elevator table pushes the pin 61 back to the position shown in FIG. 12. This moves the hanger to the right and removes the slotted blocks 55, 56, and 57 from the module pins. The elevator continues to move upwardly until the table contacts the bottom of the module. This is the work condition of the module and elevator. As shown in FIG. 15, the platform 38 and its stop 58 are returned to their position between the chain belt 37 and the interchange position. The spindle is attached to the drive shaft 21 of the module 17. The module rests on the table 64 of the elevator 41. In dotted lines is shown the lower position of the module where the elevator takes it after the machining operation has been completed. At that point, the frame of the machine tool is provided with a ledge or bracket 65 on which the elevator table 64 rests. An actuator 66 is provided to push the module horizontally onto a chain belt 67 forming part of the conveyor 14.

Figure 16:
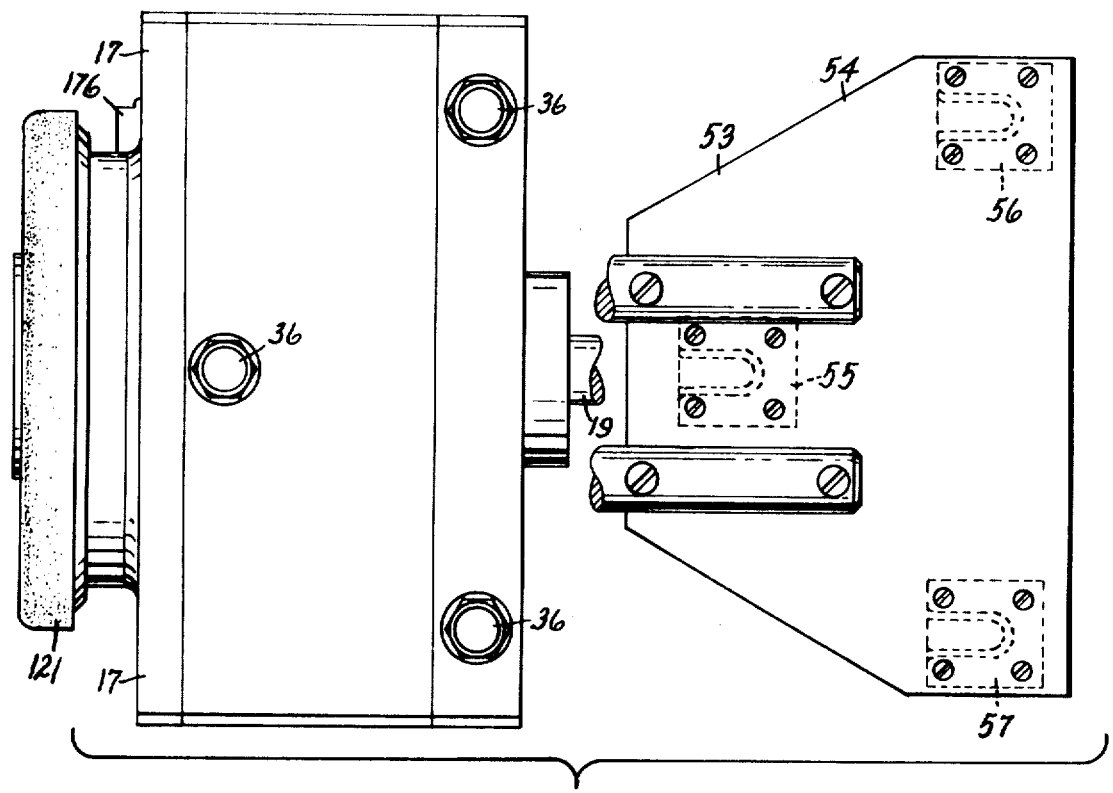
FIGS. 16, 17 and 18 are views of the connection between a module and a transport apparatus.
Figure 17:
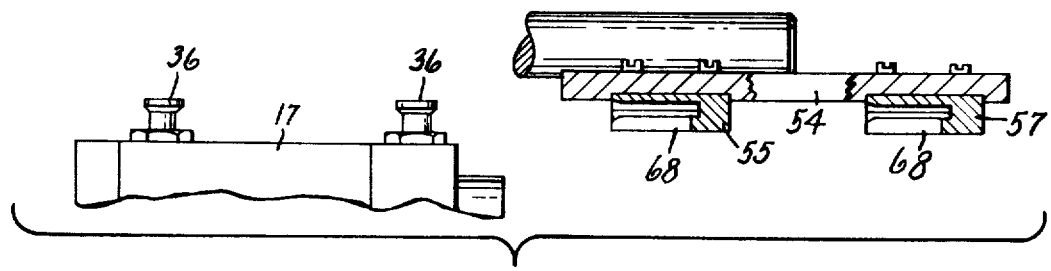
Figure 18:
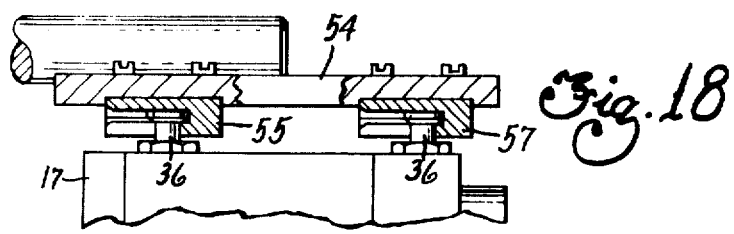

FIGS. 16, 17 and 18 are of interest as showing the details of engagement of the headed pins 36 with the slots in the blocks 55, 56 and 57. The slots in these blocks forming a part of the hanger mechanism 53 are the same as those used in the tramway 39. Each slot is flared at its entrance to assist the entrance of the pin. At the inner end, each slot is provided with a countersink or recess 68; this recess is generally conical to fit a correspondingly conically formed undersurface of the heads of the module pins and this interengagement assures against the module falling from its supporting member due to vibration, sudden stoppage and the like occurrence.

FIGS. 19 through 25 show the details of construction of the output transfer mechanism 14 which is located between the return conveyor 23 (underlying the queue storage mechanism 12) and the storage magazine 15. A supporting structure 69 mounted on the rear of the frame of the queue storage mechanism 12 carries a cantilevered arm 71 on the outer end of which is carried a rotatable vertical stub shaft 72 the lower end of which is connected to a guideway 73. In the guideway is slidably carried a track 74; finally, a carrier 75 is attached to underside of the carrier by a dovetail connection. Extending downwardly from the lower surface of the carrier are the same pattern of slotted blocks for engagement with the headed pins 36 of the module as have been described in connection with the tramway 39 and the hanger mechanism 53. Mounted on the upper surface of the track 74 is a rack 76. A spur gear 77 engages the rack and is keyed to the lower end of a vertical shaft 78 which is journaled in the shaft 72. A motor 79 is mounted over the arm 71 to rotate the shaft 78. Extending around the lower end of the stub shaft 72 is a ring gear 81 which engages a spur gear 82 which is driven by a motor 83.

Figure 23:
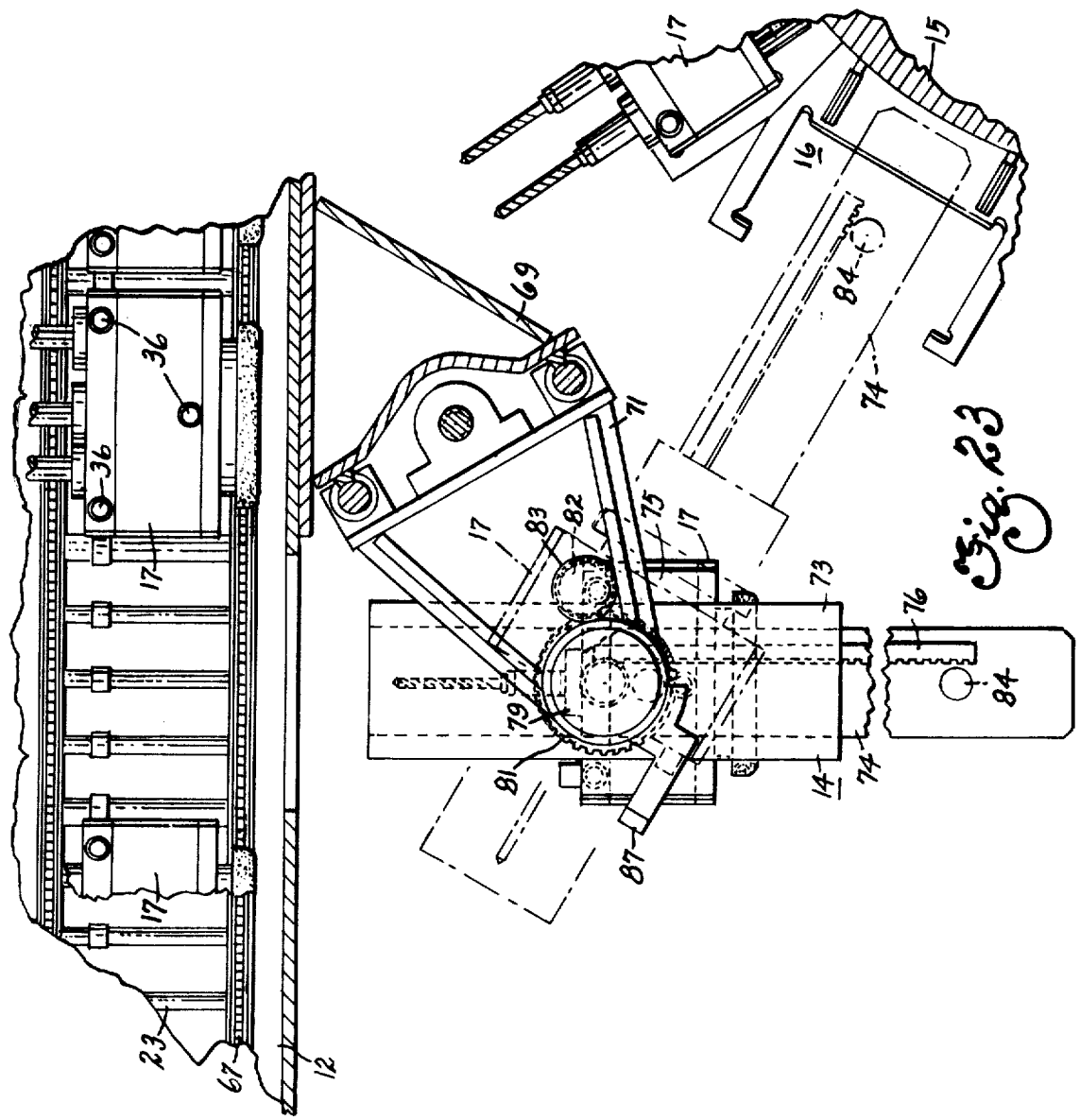
FIG. 23 is a plan view of the transfer mechanism, showing it in another condition.
Figure 26:
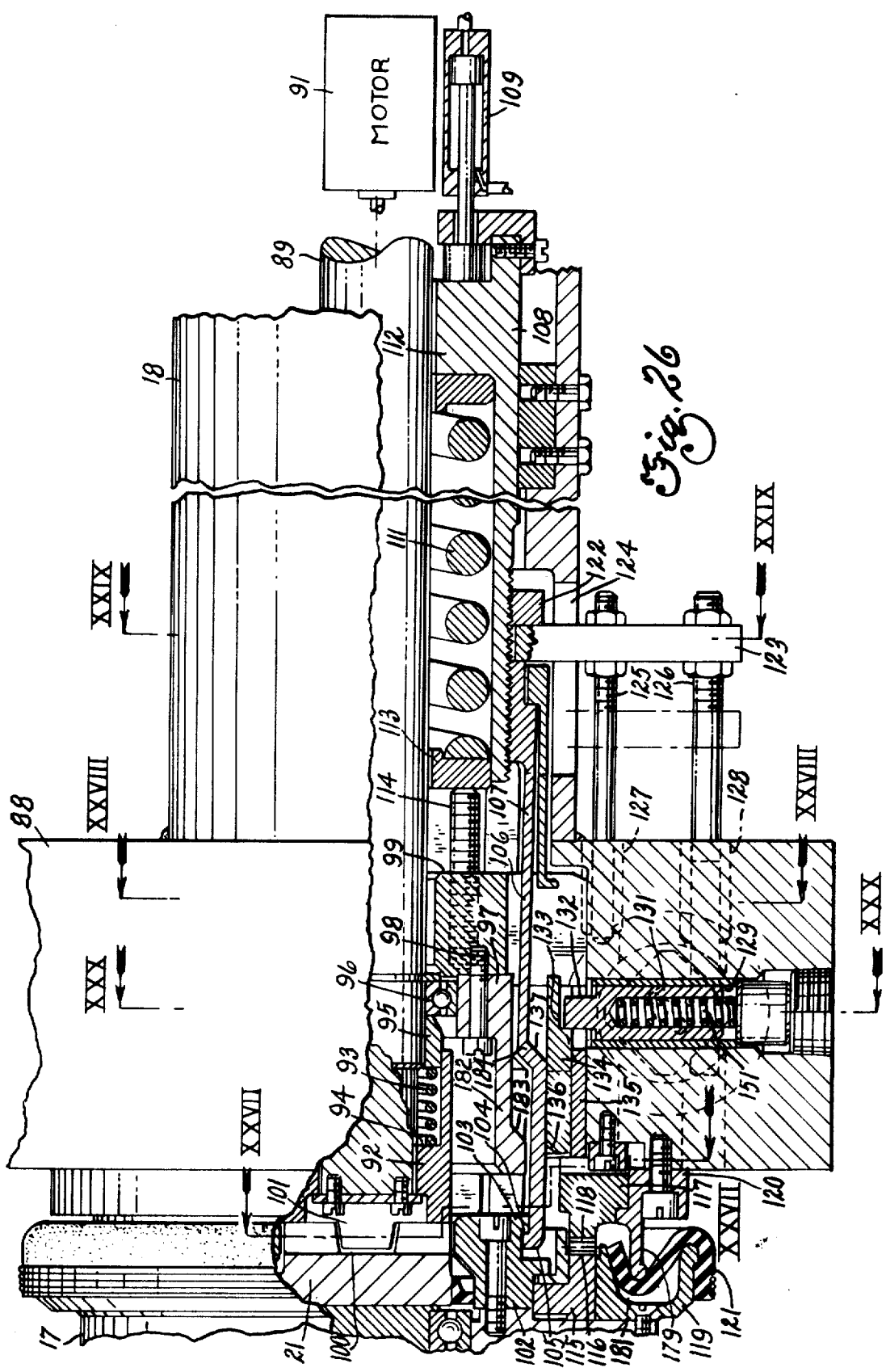
FIG. 26 is a vertical sectional view of a spindle forming a part of the machine tool.

FIG. 21 shows the output transfer mechanism 14 as it picks up a module from the output conveyor 23 for return to the storage magazine 15. FIG. 22 shows a means of locking the carrier 75 relative to the track 74. It includes a ball 84 which engages a depression 85 in the top of the dovetail on the carrier. A spring-loaded dog 86 biases the ball downwardly at all times. FIG. 23 shows the condition of the output transfer mechanism with the module removed from the conveyor 23 and halfway to the storage magazine 15. FIG. 24 shows the condition of the mechanism when the module 17 is being deposited in the magazine. FIG. 25 shows the construction of a finger 87 which is attached to the outer end of the arm 71 and which operates on occasion to inhibit the movement of the carrier 75 with the track 74.

Figure 27:
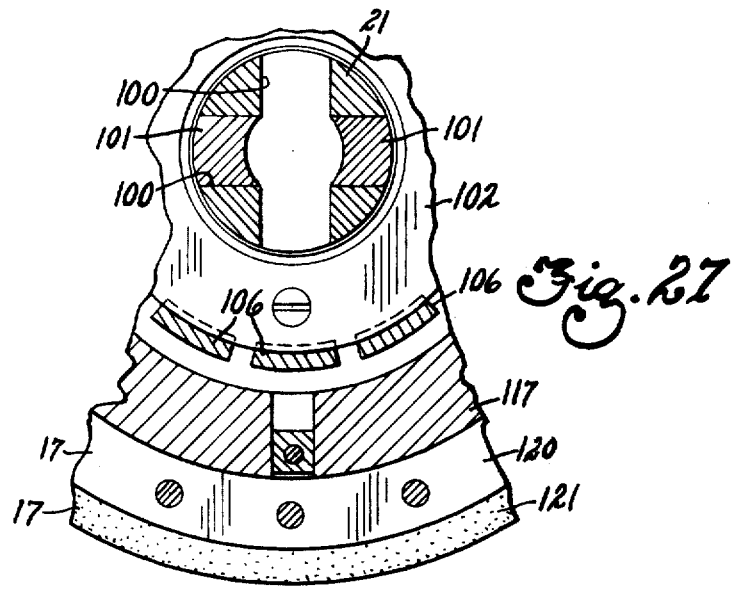
FIG. 27 is a transverse sectional view of the spindle taken on the line XXVII—XXVII of FIG. 26.
Figure 28:
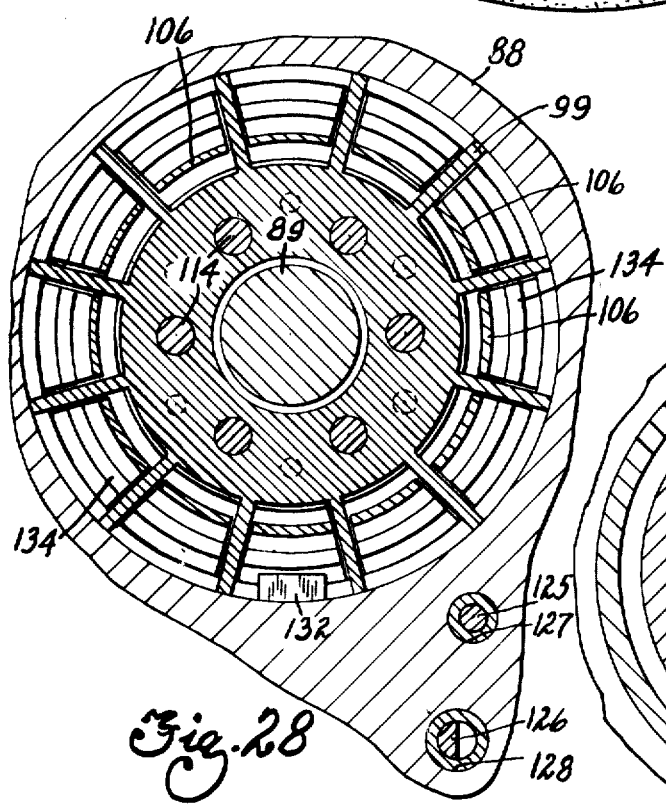
FIG. 28 is a transverse sectional view of the spindle taken on the line XXVIII—XXVIII of FIG. 26.
Figure 29:
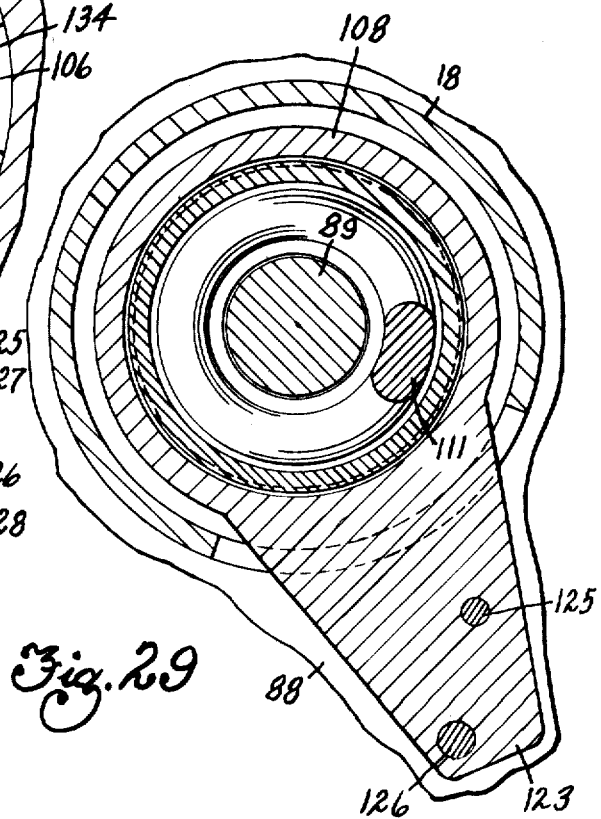
FIG. 29 is a transverse sectional view of the spindle taken on the line XXIX—XXIX of FIG. 26.

FIGS. 26 through 38 show the details of construction of the spindle 18 equipment for clamping the module 17 to the end of the spindle, to drive the input drive shaft 21 of the module to rotate the tool spindles 19. The spindle and surrounding housing 88 serve to advance the module toward the workpiece for the machining operation. Extending through the housing is a main drive spindle 89 which is connected to a motor 91 at its rearward (away from the machining area) end. At its forward end it has slidably mounted on it a short sleeve 92 which is biased in the forward direction by a coil spring 93. This spring lies under compression between an inner shoulder 94 of the sleeve and a collar 95 mounted on the shaft 89 and pressing endwise against the inner race of a ball bearing 96. This ball bearing serves to support the forward end of the spindle and has its outer race held within an annular crown piece 97 which is fastened by bolts 98 to an inwardly directed flange 99 of the main housing 88. The forward edge of the sleeve 92 is provided with forwardly directed trapezoidal-shaped lugs 101 which normally engage similarly shaped slots 100 (see FIG. 27) formed on the end of the input drive shaft 21 of the module 17.

Mounted on the housing of the module 17 outwardly of the drive shaft 21 is a ring 102 having a radial flange 103 having a conical forwardly directed surface 104. This surface is normally engaged by similar conical surfaces of flanges 105 formed on the inner surface of fingers 106 forming part of a sleevelike collet 107. The collet is threadedly connected to a sleeve 108 which is slidably mounted on the spindle 89. The sleeve is actuated for sliding motion by an actuator 109 and carries the collet 107 with it during such motion. The sleeve 108 is biased rearwardly by a coil spring 111 which operates at one end against an inwardly directed flange 112 of the sleeve 108 and at the other end against a ring 113 which is mounted on the spindle 89. The outer surface of this ring lies in sliding relationship to the inner surface of the sleeve 108 and is held in place by studs 114 extending axially from the flange 99 forming part of the housing 88.

Mounted on the housing of the module 17 axially of the drive shaft 21 is a ring 115 having axially directed gear teeth 116. A similar ring 117 is mounted on a forward face of the spindle housing 88 and is provided with gear teeth 118 which are complementary to the teeth 116. These rings and gear teeth form an extremely accurate locating connection between the module 17 and the spindle housing 88, thus assuring that the axes of the tool spindles 19 are very accurately related to the main spindle axis to permit numerical control of the machining operation. This connection is similar to that described in the copending patent application of Perry et al., Ser. No. 690,941, filed Dec. 15, 1967. Outwardly of the ring 115 is located a ring 119 having a flexible seal 121 which serves to cover the teeth 116 when the module is separated from the spindle and housing; this seal cooperates with a flanged ring 120 mounted on the spindle housing in the manner shown and described in the patent application of Attermeyer, Ser. No. 690,926, filed Dec. 15, 1967. Mounted on the sleeve 108 and held against the end of the collet 107 by a nut 122 is an arm element 123 (see FIG. 29) which extends radially through an opening 124 in the housing 88. Exteriorly of the housing the arm carries two axially extending rods 125 and 126 which extend into axial bores 127 and 128 in the housing 88, these bores being located laterally of a vertical plane through the axis of the spindle.

Extending radially through a suitable bushed bore 129 in the housing is a cylindrical detent 131. The inner end of this detent has a finger 132 which on occasion engages an external shoulder 133 on a segmented sleeve 134 (see FIG. 30). This sleeve is slidably carried in a bushing 135 and has a conical bevel 136 on its forward inner edge for engagement with a similar beveled surface 137 on each of the fingers 106 of the collet 107.

FIGS. 30 through 35 show the parts interrelating the rods 125 and 126 and the detent 131. Suitably mounted within the housing 88 in axially spaced bushings 138 and 139 is a horizontal transverse shaft 141. Integral with this shaft is a wheel 142 having eight equally spaced notches 143 which are engageable by a spring-loaded detent 144 (see FIG. 32). Also formed integrally with the shaft 141 is a square cam 145 whose corners are rounded and which is in line with and engageable by the rods 125 and 126. As is evident in FIGS. 30 and 33, the intermediate portion of the rod 126 has material removed to give it a semicircular shape and provide a flat vertical diametrical surface 146 which on occasion lies against a broad flat end surface of the cam 145. The extreme end does not have material so removed, so that a lug 147 appears (see FIGS. 33 and 34). The rod 125 is located to strike a corner of the cam 145 on occasion, as in FIG. 33, or to lie outside and parallel to a flat surface of the cam, as in FIG. 35.

The inner end of the shaft 141 is formed with a generally diamond-shaped cam 148 which lies in a slot 149 formed in the side of the detent 131 (see FIG. 31). The detent is biased upwardly at all times by a coil spring 151.

Figures 36, 37:
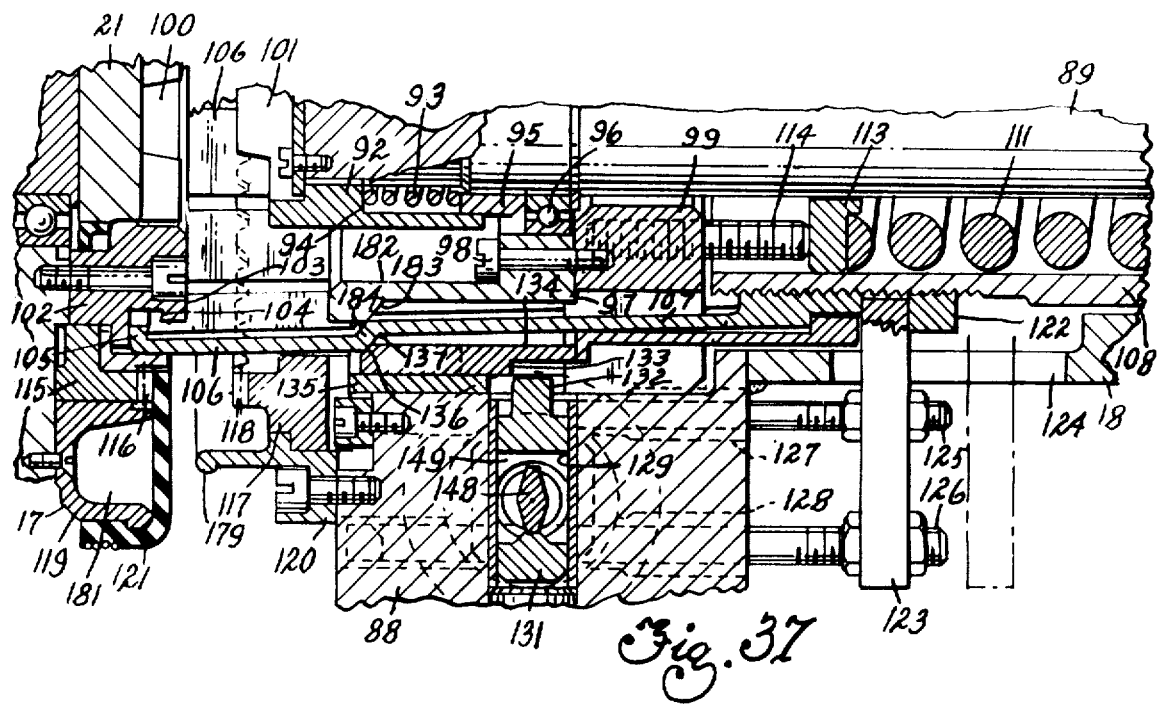
FIGS. 36, 37 and 38 are vertical sectional views of the spindle similar to that of FIG. 26, but with the parts in various other conditions.
Figure 38:
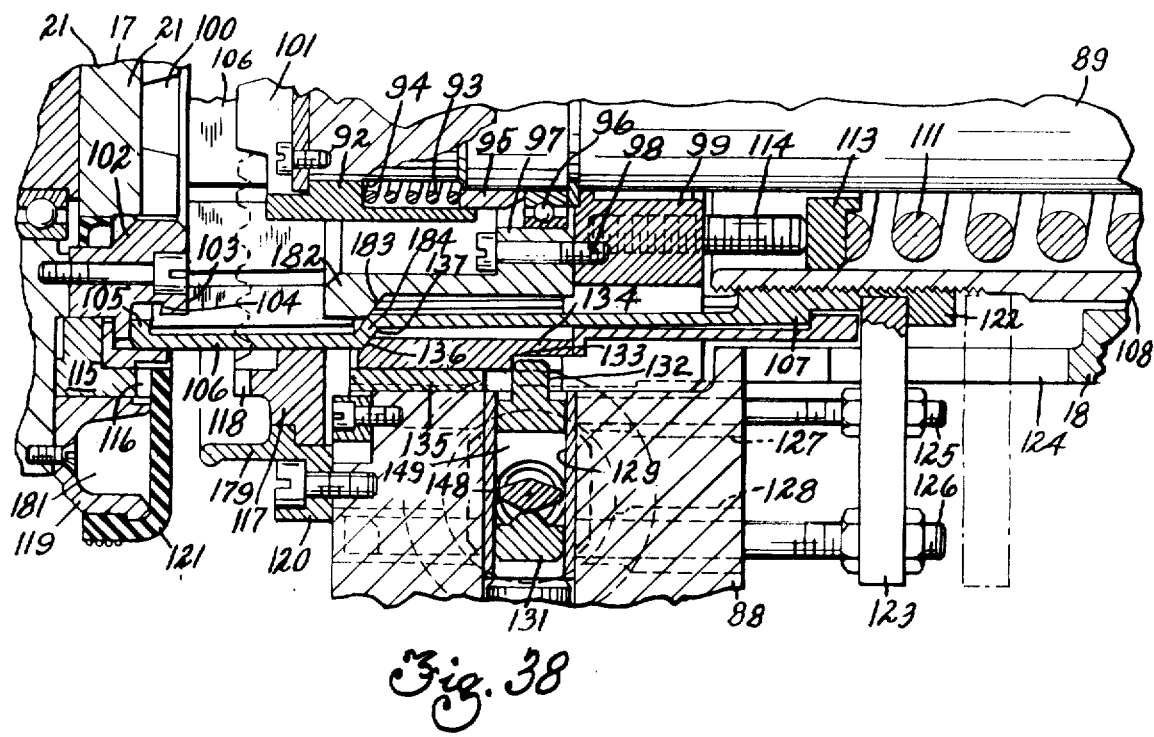

FIGS. 36, 37 and 38 show the condition of the parts at various stages in the cycle and will be referred to more specifically in connection with the description of the operation.

Figure 39:
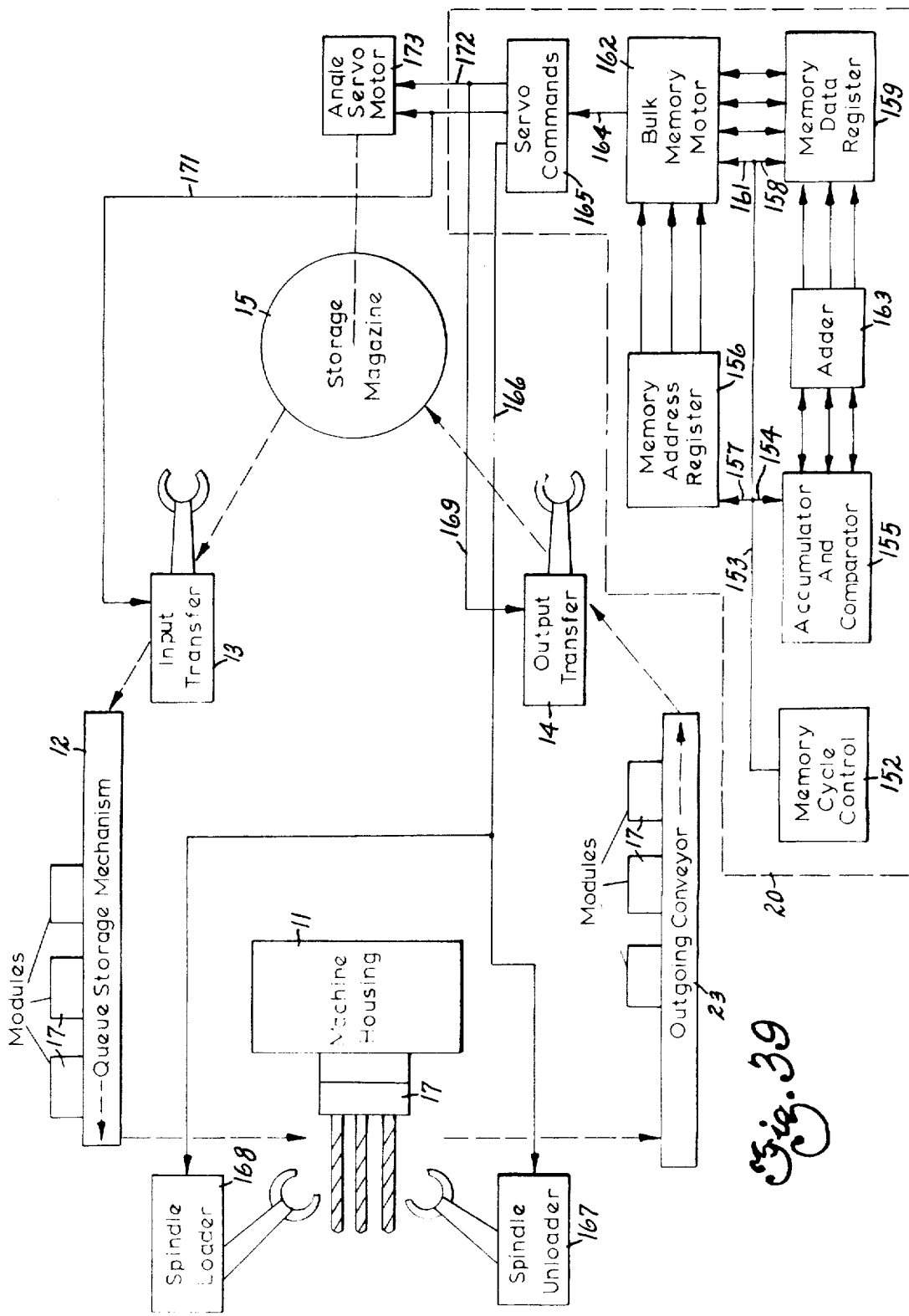
FIG. 39 is a schematic view of an electronic data processing apparatus forming part of the invention.

FIG. 39 shows the relationship between the control 20 and the other parts of the machine tool. The solid lines are used in the drawing to indicate cables carrying electrical data and command signals and the broken lines are used to indicate the flow of tool modules and mechanical connections. The output of a memory cycle control 152 flows to a line 153 whose branch line 154 is connected to an accumulator and comparator circuit 155. Another branch line 157 feeds to a memory address register 156. A branch line 158 is connected to a memory data register 159 and another branch line 161 feeds to a bulk memory matrix 162. The accumulator and comparator circuit 155 is connected through an adder circuit 163 to the memory data register 159. The memory address register 156 is connected to the bulk memory matrix 162 and this matrix is connected for signals in both directions to the memory data register 159. An output line 164 connects the matrix 162 to a servo command 165. Signals from the servo command pass through a line 166 to the spindle unloader 167 and the spindle loader 168. Command signals also pass through a line 169 to the output transfer mechanism 14 and through a line 171 to the input transfer mechanism 13. Signals from the servo command 165 pass through a line 172 to an angle servo motor 173 which drives the various disks 26, etc. of the storage magazine 15.

OPERATION

The operation of the machine tool 10 will now be readily understood in view of the above discussion. It must be assumed that a workpiece 40 has been brought in front of the spindle 18 and fixed in place on the support 30 in the manner shown and described in the patent application of Perry, Ser. No. 690,940, filed Dec. 15, 1967; by the use of the manufacturing system described in that application, the workpiece is presented to the spindle in very accurate positioning, so that the machining operation can take place under numerical control without the intervention of a human operator. In order to do this with a multiple-spindle module of the type described above, however, it is necessary that the module be connected to the spindle with the same degree of accuracy as the workpiece is located relative to the spindle. That is the reason for the use of the connector described above. As a particular workpiece joins the queue of workpieces waiting to be operated on at the work station represented by the machine tool of the invention, the system control tells the machine tool to bring up a stored module for use. The memory banks of the control 20 know what compartment 16 of the storage magazine 15 contains the needed tool module. The particular disk 26, etc., containing that particular compartment is rotated until it lies opposite and adjacent to the input transfer mechanism 13. This mechanism includes an elevator which moves vertically until it is on a level with the said disk and it then transfers the particular module to the outer end of the queue storage mechanism 12, particularly to the conveyor 22. The modules, therefore, are lined up in queue in the same order as the workpieces are in queue on the conveyor approaching the machine tool work position, so that the particular module arrives at the machine spindle at the same time as its particular workpiece. At that time the module 17 is locked to the spindle 18, while the workpiece is locked through its pallet to a fixed support in the manner shown and described in the patent application of Perry et al., Ser. No. 690,941, filed Dec. 15, 1967.

After the machining operation has been carried out, the module is released from the spindle and carried downwardly to a lower level by the elevator 41. It is then placed on the conveyor 23 and is moved to the right in FIG. 3 away from the work area. The output transfer mechanism 14 then lifts the module from the conveyor 23 and presents it to the storage magazine 15. For that purpose, the memory banks of the control 20 know where there is an empty compartment 16 and command signals are sent out to the disk containing such an empty compartment and the disk is rotated so that that compartment arrives adjacent the transfer mechanism. A command signal indicates to the transfer mechanism the particular disk involved and operates the elevator system to raise or lower the mechanism to the level of that disk. The placement of the module in the compartment then takes place and the memory banks are adjusted to associate that particular module with that particular compartment for future use.

From an examination of FIGS. 5 and 6, it can be seen that the location of the module 17 in the compartment 16 is brought about in an accurate manner by the engagement of the module with the adjustable stop 35 and by the bottom of the module nesting securely in the socket 34. The disk 26 is rotated by the motor 32 operating through a pinion gear 174 operating on a ring gear 175 forming part of the disk. The disk 27 is similarly independently rotated by the motor 33. Each of the disks 26, 27, 28, 29, and 31 can be rotated to bring any one of its compartments either to a first position adjacent the input transfer mechanism 13 or to a second position adjacent the output transfer mechanism 14. It should be noted that the control 20 is arranged to assure that, when a specific disk, say, disk 26, has been rotated so that one of its compartments is in the first position to introduce a "new" module into the queue line, that same disk is not called upon to rotate to bring an empty compartment to the second position to receive an "old" module from the work position. Instead, another disk, say, disk 27, will be rotated to bring an empty compartment to the second position.

The control 20 also provides an inhibiting command signal to take care of the situation that occurs when the same module must be used a second time very soon after it has been used a first time. Now, if two workpieces that are exactly the same follow one another in the workpiece conveyor queue, the control simply causes the same module to stay at the spindle after the first workpiece has had its machining operation performed. A different problem is presented, however, where two similar workpieces follow one another in the queue, but there are one or more intervening different workpieces. In this case, the control 20 sends out command signals which temporarily prohibit the transfer of "new" tool modules from the storage magazine to the queue line. At the same time, the tool module in question is removed from the spindle and the modules for the aforementioned intervening workpieces are introduced seriatim to the spindle. While the "intervening" module (or modules) is performing its operation on the "intervening" workpieces, the module which is to be used immediately again, is quickly transferred to the end of the queue. This is done by transferring it to an empty compartment of the storage magazine, rotating the disk around until the compartment is in the "input" position, and transferring it from there to the queue line. This can be done so quickly that, even if there is only one "intervening" module, the "repeat" module is available to be moved into position in front of the spindle as soon as the intervening module has finished its operation on the intervening workpiece.

The movement of a module 17 along the queue line conveyor 37 and into the work area can be understood by referring to FIG. 7 through 10. When a module arrives at the end of the conveyor, a lug 176 is engaged by the escapement lever 49 and stopped. It remains at the end of the conveyor while the platform 38 is occupied in the transportation of the preceding module into the work area. When the platform returns, however, the bayonet slot 52 on the platform acts on the pin 51 on the lever and pulls it outwardly, thus disengaging from the lug 176 on the module and allowing the module to be carried onto the platform 38. The module is at that time at the head of the queue; that is to say, it is the next module to be used at the work position.

The module 17 is moved from the end of the conveyor 37 to the platform 38 by the tramway 39. The actuator 45 is energized and moves the slide 44 to the left. This allows the carrier or pickup plate 46 to fall downwardly and to move to the left (toward the spindle) also. This motion causes the slots 47 to move over the headed pins 36 and to carry the module along with the plate. Eventually, the actuator 45 reaches its extreme position of travel and returns. The slots 47 move laterally off the pins and the inclined slots 50 in which the rollers of the plate are carried act on the rollers to lift the plate so that it does not strike the pins on the next module, which has in the meantime moved to the end of the conveyor 37 and is stopped by the escapement lever 49.

When a module has been released from the spindle and has been lowered out of the work position by the elevator 41, the actuator 42 is energized to move the platform 38 into the work position. The side of the module 17 eventually strikes the stop 62 (FIG. 8). The hanger mechanism 53 grasps and supports the module and the platform 38 returns to its initial position.

Referring to FIGS. 11 through 15, the stop 58 strikes the lever 59 which then swings in a horizontal plane about its pivot and throws the pin 61 outwardly. The lever operates through the shaft 63 to pull the operating bars of the hanger mechanism 53 to the left (in FIG. 11). These bars in turn carry the plate 54 and its blocks 55, 56, and 57 to the left (toward the spindle 18) also. The slots in the blocks engage and slide over the headed pins 36 of the module, so that the conical lower surfaces of the heads of the pins fall into the conical recesses at the inner ends of the slots. The module is then not only supported in the vertical direction, but is also able to resist any horizontal movement due to thrust from the spindle as the spindle and module are being connected. After the platform 38 has returned to its initial position and leaves the module suspended from the plate 54, the spindle and module are connected. Then the elevator 41 moves upwardly and its table 64 moves up under the module to engage it lightly. The arrival of the table 64 under the module releases the hanger mechanism 53 from the pins 36 of the module. This is because a dog 177 on the table strikes the horizontal pin 61 and slides it to the right (in FIG. 14) so that it strikes the lever and swings it back to retract the table 54.

In FIG. 15 it can be seen that, after the module 17 has performed its operation and has been released from the spindle, its weight is carried solely by the elevator table 64. The elevator is lowered by an actuator 178 until the bottom of the table engages the bracket 65. The actuator 66 is then energized to push the module onto the chain belt 67 forming part of the conveyor 23 which, in turn, carries the module to the right. Eventually, the module arrives in position to be engaged by the output transfer mechanism 14.

FIGS. 19 through 25 show the operation of the output transfer mechanism. To begin with, the carrier 75 has been moved to the extreme end of the track 74 (as shown in FIG. 19) and the track is retracted to the extreme position (adjacent the conveyor 23) relative to the guideway 73 (see FIG. 21). The assemblage of trackway or guideway 73, track 74, and carrier 75 are swung from the side of the module until the pins 36 are between the carrier blocks and slots, on the one hand, and the center of rotation of the assemblage on the other. The motor 79 is then energized to rotate the gear 77 and to move the rack 76 and the track 74 longitudinally through the trackway 73 (see FIG. 23). The carrier 75 is also moved in this way, because of the engagement of the detent ball 84 with the depression 85 in the upper surface of the carrier. This action continues until the module 17 is carried to a position underlying the swing axis, i.e., underlying the shaft 72. Then, the assemblage is rotated about the swing axis by the energization of the motor 83 which acts (see FIG. 20) through the gear 82 to rotate the ring gear 81 and the shaft 72 and the trackway 73. The assemblage is moved in this way until the forward end of the track 74 extends into an empty compartment of the storage magazine. Then, the motor 79 operates to move the track rearwardly relative to the trackway 73 (see FIG. 24). During the swinging motion, however, the carrier 75 and the module have been engaged rearwardly by the finger 87; when the track 74 tries to carry the carrier rearwardly with it, the finger resists such movement, the ball 84 pops out of the depression 85, and the carrier and module stay in place under the swing axis (see FIG. 25). Eventually, the track 74 reaches its extreme rearward position and a detent ball at its forward end engages the depression 85 in the carrier. Then, when the motor 79 is reversed and the track moves forward again, the carrier and module remain at the forward end and move with that end into the magazine compartment 16.

FIGS. 26 through 38 best show the manner in which the module 17 is connected to the spindle 18. Starting with FIG. 37, the module is supported on the hanger mechanism 53 with the input drive shaft 21 spaced from but generally axially aligned with the spindle 89. The collet 107 is retracted to a position within the housing 88. The actuator 109 is energized and moves the sleeve 108 to the left carrying the collet with it; this is the condition shown in FIG. 37. It will be noted that the movement of the sleeve and collet to the left (toward the module) also produces a similar movement of the arm 123. This drives the rods 125 and 126 further into their bores 127 and 128. The rod 125 strikes the corner of the cam 145 and turns the shaft 141 and the cam to the position shown in FIG. 35. The detent 144 snaps into a notch 143 of the wheel 142 at the new position and prevents the shaft from moving due to vibration and the like. Now, the rotation of the shaft 141 produces a similar rotation of the cam 148 which acts to pull the detent 131 downwardly against the pressure of the spring 151. The finger 132 at the upper end of the detent is removed from the shoulder 133 of the sleeve 134. This allows the fingers 106 of the collet to be sprung outwardly, so that, as the collet moves to the left, it can pass over the flange 103 on the ring 102 of the module without touching it. Once the flange 105 on the ends of the collet fingers has moved axially past the flange 103, the actuator 109 is reversed and the sleeve 108 and the collet 107 start to move to the right. The dog 147 on the rod 126 strikes the corner of the cam 145 and rotates it another 45°, so that the cam 148 is moved to its flat condition (see FIG. 38). This allows the spring 151 to push the detent 131 upwardly so that its finger 132 engages the shoulder of the sleeve 134 and inhibits any further movement of the sleeve 134 to the left. Further movement of the collet to the left causes the fingers 106 to cam over the bevel 136 on the sleeve and move inwardly so that the surface of the flanges 105 of the finger of the collet engage the surface 104 of the flange 103 of the ring 102 of the module. The apparatus eventually arrives at the condition shown in FIG. 26.

Now, the engagement of the flanges of the collet fingers with the flange of the module causes the module to be drawn toward the end of the spindle; as this action takes place, first the lugs 101 of the sleeve 92 enter one of the cross slots 100 on the input drive shaft 21 of the module. The sleeve 92 is spring-biased and, if the lugs do not immediately enter the slots, then the sleeve is pressed against the face of the shaft and spring pressure accumulates until rotation of the shaft 89 by the motor 91 causes the lug to snap into the slot. The spring mounting of the sleeve allows the lugs to bottom in the slots and, yet, the movement of the module toward the shaft 89 can continue without damage to the sleeve. As the movement continues, the teeth 116 of the ring 115 on the module eventually mesh with the teeth 118 on the ring 117 of the spindle housing. Before this engagement takes place, however, the seal 121 is drawn away from the teeth 116 so that they are exposed. This movement takes place by the operation of an annular flange 179 which is mounted on the spindle house and which drives the bight of the seal 121 into an annular recess 181 formed on the face of the ring 119 of the module.

It is clear, then, that the engagement of the lugs 101 with a slot 100 gives a rugged driving connection between the spindle 89 and the drive shaft 21 of the module. At the same time, the connection provided by the engagement of the teeth 116 with the teeth 118 brings about a very accurate alignment of the spindle axis with the shaft axis, so that the positions of the axes of the tool spindles are similarly accurately located relative to the workpiece.

It should be noted (referring to FIG. 26) that the sleeve 97 has an outwardly directed flange 182 with a rearwardly directed conical surface 183 that cooperates with an offset 184 in the collet to open the collet fingers during movement to the left. This same offset allows the collet to close under the urging of the sleeve 134 during the movement to the right.

In order to understand the operation of the control 20, it is necessary to refer to FIG. 39. For the purpose of the present discussion, the "incoming queue" is the line of modules 17 arranged on the conveyor 12 and the "outgoing queue" is the line of modules on the conveyor 23.

The "memory" or bulk memory matrix 162 consists of resettable devices for maintaining numerical data readily accessible and arranged in data locations or addresses, e.g., magnetic core data storage arrays. It includes sections for maintaining numbers of tools in both incoming and outgoing queues, tools in storage, the tool in the machine, and certain fixed addresses for processing use analogous to a scratch pad in function. The memory address register 156 (M.A.R.) consists of a group of bistable circuits into which a numerical quantity in binary code form can be entered to identify a unique location in the memory.

The memory data register 159 (M.D.R.) is a group of bistable circuits into which binary coded numerical data can be retained either as shifted out from the MEMORY or as prepared for shifting into the MEMORY, the location of the data, as related to the MEMORY determined by the M.A.R. The accumulator and comparator 155 (ACC.) consists of a shift register circuit for retaining binary coded data and including arithmetic capabilities for determining correspondence of the number stored therein with that in another register such as the M.D.R.

So far as the basic cycle control is concerned, the tool modules 17 are loaded into the various compartments 16 of the multilevel tool storage magazine 15 by the machine operator or setup man in accordance with a schedule or computer printed manuscript. A corresponding length of binary coded tape is played into the control 20 to set the MEMORY such that it contains, at the position for identifying tool modules in bulk storage, the tool module numbers and initial positions where these tool modules are found in bulk storage, including the angular position and the elevation level or number of the disk. The apparatus, when so arranged, is prepared for automatic operation for the particular operations for which the tool modules in bulk storage are suited.

It is noteworthy that an additional data number also can be included conveniently in the data associated with each tool module number and can be stored and moved through the system. A number corresponding to the actual length of a tool can be used in modifying positioning coordinates in a numerical control system. Where a milling cutter is involved, the data might also include a figure for the actual cutter diameter. This can be used for automatically causing adjustment of a cutter diameter compensation circuit. In either case circuitry would be provided in the control 20 to utilize the additional information and make the appropriate changes in resultant machine movements.

For any particular series of operations to be controlled by a single tape, it is more convenient to include in the first portion of the tape a complete serial listing of the numbers of the tool modules to be used for each of the operations. This is because of the queuing of tools both to and from the machine spindle. The tool modules are all handled in queues of variable length before and after actual use in a cutting operation. The tape is coded in blocks of data that are used in controlling coordinate movements for any particular machining operation. Therefore, it is impossible to provide the machine with a look ahead for future tools during the time that a particular block of tape information is being utilized. To permit such necessary serial listing and initial reading, the MEMORY includes a portion that is filled with the tool module numbers in their order of use in the seriatim operations recorded throughout the tape length; this will provide the system with the necessary additional vision.

The cycle descriptions that follow are concerned with the data handling and transfers that are made within the control 20 and, more particularly, are for the changing of data in the portions of the MEMORY used in maintaining information for use with tool modules in the spindle, the incoming and outgoing queues, and in bulk storage.

The first cycle to be described is for spindle unloading which is the data accounting procedure when tools are removed from the machine spindle and work area and are added to the outgoing queue. It comprises the following steps listed as they occur:

1. The M.A.R. is set to an arbitrary address such as 000. This is one of the "scratch pad" addresses within the MEMORY which is used only for temporary storage of data during the cycling functions. This permits nondestructive storage of data generated in the interim cycle periods.

2. The information stored at 000 MEMORY address is output and received in the M.D.R. The data received is the address of the output queue base register, this MEMORY address containing the tool module number for that tool, if any, found in the first position (closest to the output transfer mechanism) of the outgoing queue.

3. The output base register address is transferred from the M.D.R. to the M.A.R.

4. The MEMORY information at the base register address is output and stored in M.D.R. This is the tool number at the first position in the outgoing queue.

5. The M.D.R. is tested by built-in circuitry for the presence of "0" or no tool number. This will indicate that the base position is empty and, being the first position, indicates that the outgoing queue is completely empty. The spindle can be unloaded immediately if a "0" is detected.

6. If a "0" is detected in the M.D.R. in step 5, then the M.A.R. contents are transferred to the ACC.

7. The M.A.R. is loaded with the address of the spindle, a fixed address.

8. The tool module number in the MEMORY at the spindle address is transferred to the M.D.R.

9. The contents of the ACC (the outgoing queue first position address) are now transferred to the M.A.R. and the contents of the M.D.R. are inserted into the MEMORY at that address. Thus, the tool module number of that tool in the spindle at the start of this cycle is loaded into the MEMORY. Concurrent with this cycle step, the actual transfer of the tool module in spindle position to the outgoing queue is made and, when complete, the data transfer is made, so that the MEMORY is loaded.

10. If a "0" is not detected in cycle step 5, then steps 6 through 9 do not immediately occur in sequence. Instead, the data in the M.A.R. is transferred to the ACC. This is the outgoing queue first position address. A single unit of the queue length modulus is added to the address transferred to step it to the next position for a tool module in the outgoing queue.

11. The sum contents of the ACC are transferred back to the M.A.R. and the contents of that address are transferred to the M.D.R.

12. The check for "0" of step 5 is again made. If a "0" is detected, then steps 6 through 9 now occur. If no "0" is detected, steps 10 through 12 repeat until a "0" is detected.

The steps 10 through 12 will completely and repetitively cycle through the queue length modulus until a "0" is found. This will be true any time that an open spot is created in the output queue by the transfer of a tool module therefrom into storage prior to the unloading of the spindle. If no "0" is detected, the spindle tool module cannot be moved to the queue and the machine will have to wait until an opening in the last position of the outgoing queue is created by the transfer of the first position tool to storage and the advance of the queue by one position.

The second control cycle to be described is that for transferring within the MEMORY of the number of the tool module in the first position of the outgoing queue into the bulk storage magazine to some undetermined empty compartment therein. This MEMORY transfer occurs at the same time that the transfer is made physically. It is the memory accounting procedure associated with movement of a tool module from outgoing queue to the storage magazine. The following are steps in the Outgoing Queue Unloading Cycle:

1. The M.A.R. is set at the address for the lowest or first sequential position of the bulk storage.

2. The tool module number from the MEMORY is output from the address location to the M.D.R.

3. A check for "0's" is made at the M.D.R.

4. If the tool position data is not "0", then a tool module is present at that position in storage. Therefore, the M.A.R. is incremented one unit to address the next storage position data. Steps 2 and 3 are repeated. This incrementing continues until a "0" data position is found.

5. When a "0" is detected at the M.D.R., the address in the M.A.R. is output to the Servo Command circuit 165 to effect positioning of the output transfer mechanism 14. The cycle control waits for a feedback signal that indicates the mechanism is in position.

6. When "in position" signals occur, the transfer of module from queue to storage is made.

7. A feedback signal indicating completion of step 6 causes the address in the M.A.R. to be transferred to the ACC.

8. The M.A.R. is set at the fixed or "scratch pad" address for the outgoing queue base address 000 (see steps 1, 2 of Change of Spindle Cycle).

9. The MEMORY data at the 000 address is output to the M.D.R. This is the current address of the output queue base register.

10. This address in the M.D.R. is then transferred to the M.A.R.

11. The tool module number stored at the address in steps 9, 10 is output to the M.D.R. and the address in the M.A.R. is thereafter cleared.

12. The address stored in the ACC at step 7 is now set into the M.A.R.

13. The tool module number in the M.D.R. is written into the MEMORY at the location defined by the address of the M.A.R. which is the position corresponding to the physical location of the storage compartment 16 to which the module was transferred in step 6.

14. The M.A.R. is set at the "scratch pad" address 000.

15. The data at this address is output from the MEMORY to the M.D.R. It is the current address of the outgoing queue base register.

16. The address in the M.D.R. is transferred through the adder circuit 163 to the ACC to place therein the contents of the M.D.R. plus 1 unit (in modulus of the queue).

17. The contents of the ACC are then transferred directly back to the M.D.R.

18. The M.A.R. is set at 000 address and the new effective outgoing queue base address is stored in this "scratch pad" data position of the MEMORY.

As each module is removed from the outgoing queue, the next module is shifted to the lowest physical position, but the information in MEMORY is not cycled or stepped in any manner to change data storage locations. Instead, the technique of updating the base register address is used so that, when the base register address is set, the proper memory location is identified and correct data is read out when interrogated. This is the function of steps 14 through 18 of this cycle.

The next control cycle to be described is the Spindle Loading Cycle, that is for placing a tool in the machine from the incoming queue line. The steps of the cycle are sequential and described as follows:

1. The M.A.R. is set at a "scratch pad" address 001 (a second address different from that in previously described cycles).

2. The data at the 001 MEMORY address is output to the M.D.R. which is the address of the incoming queue base address.

3. This address is then transferred from the M.D.R. to the M.A.R.

4. The physical tool module transfer is now made (this cycle can only be performed when the machine spindle or work position is vacant (after a machine spindle unloading cycle). Upon a feedback signal of completion, the tool module number at the address in step 3 is output from MEMORY to M.D.R.

5. The M.A.R. is set with the spindle address.

6. The MEMORY at the spindle address is set to record the number in the M.D.R.

7. The M.A.R. is again set to 001 address, the "scratch pad" functioning unit.

8. The data at that MEMORY address is output to the M.D.R. which is the incoming queue base register.

9. The incoming queue base register address is transferred from the M.D.R. through the adder circuit 163 and the address plus one unit (modulus of the incoming queue) sum is thereby transferred to the ACC.

10. The M.A.R. is still set with 001 and the contents of the ACC are now recorded in the MEMORY at that address.

The same concept of base register and techniques for updating its identity are used for the incoming queue as for the outgoing queue.

The final cycle to be described is that Incoming Queue Loading which is the accounting for the information in the various stores portions of the MEMORY when the incoming queue is loaded from bulk storage. The cycle steps are set out in detail below:

1. The tool module number of the next module in sequence is read and the next module number is placed in the ACC. This reading is of the serial listing of tool numbers read into the system at the start of any particular program.

2. The M.A.R. is set with the address of the lowest position in bulk storage.

3. The tool number from MEMORY at that address is read into the M.D.R. and compared with the number in ACC.

4. If the two members are not equivalent, the address in the M.A.R. is incremented one unit and step 3 is repeated.

5. If the required equivalence is not found, the incrementing and testing continues to sequence through bulk storage, the queues, and the spindle memory portions. If the tool number is not found in any of these, a next higher dummy address is sequenced as the final step and an alarm sounds to indicate complete absence of the tool.

6. A transfer can only be made to the incoming queue when the tool module number is found in a bulk storage position. When the module is found there, the servo motors 32, 33, etc. are operated to position the module to a position adjacent the input transfer mechanism 13. The module cannot be shifted until it is determined that a space is available in the incoming queue. In preparation for later steps, the following sub-steps occur:

6a. The address in the M.A.R. is transferred to the ACC.

6b. The M.A.R. is addressed with a "scratch pad" 010 used only in this control cycle.

6c. The contents of the ACC are stored in MEMORY 010 address.

7. A control subcycle for unloading is then begun and this comprises the following steps:

8. The M.A.R. is set to the address 001 ("scratch pad" storage or incoming queue base register address storage, previously described).

9. The data at 001 is output to the M.D.R.

10. The address of the incoming queue base register address is transferred from the M.D.R. to the M.A.R.

11. The tool number at that address is output from MEMORY to M.D.R.

12. The M.D.R. is checked for "0".

13. If there is no "0", the address in M.A.R. is transferred to the M.D.R.

14. The address in M.D.R. is transferred through the adder circuit 163 and to the ACC. where the address plus one unit (modulus of incoming queue) is retained.

15. The contents of ACC are transferred to the M.A.R.

16. The number at the MEMORY address now in the M.A.R. is read into the M.D.R.

17. The check for "0" is now repeated. If no "0", then steps 13 through 16 are repeated.

18. If there is "0", then a vacancy exists in the incoming queue and the input transfer mechanism 13 is actuated to move the module from the storage magazine to the queue line. When the transfer is complete, the data accounting entries are made in the MEMORY. The steps for this follow in the serial sub-cycle.

19. The address in the M.A.R. is transferred to the ACC which is used as a temporary store now.

20. The M.A.R. is set to the "scratch pad" address 010.

21. The data from MEMORY 010 address is transferred into the M.D.R. It is the address of the position in bulk storage from which the tool transferred (see sub-steps 6a–6c).

22. The M.D.R. contents are transferred to the M.A.R.

23. The number of the module just transferred to queue is read into the M.D.R. and the memory storage position is cleared.

24. The address being retained in ACC (see step 19) is transferred to the M.A.R.

25. The module number in the M.D.R. is read into the incoming queue portion of the MEMORY at that address and retained there.

This completes the cycle descriptions. It is pointed out that, when any one of these cycles is begun, it is completed before any other cycle is begun. The Cycle Control unit has a built-in logic to assign priority of cycles. The highest priority is the Spindle Unloading Cycle so that a change of tools can be made at the time soonest after completion of a machining operation. The next priority is the Spindle Loading which must follow as soon after the unloading as possible. Third priority is the Incoming Queue Loading cycle and, finally, lowest priority is the Outgoing Queue Unloading cycle.

A study of the machine tool described above indicates that the principles can be applied to single-spindle tools, so that where the term "module" is used, it will be understood that the word "too" may, in appropriate circumstances, be substituted. It is contemplated that, in those operations where a slow cycle time can be tolerated, the input transfer mechanism 13 and the output transfer mechanism 14 may both be replaced by a single transfer mechanism similar to the output transfer mechanism 14 shown in FIGS. 19 through 25.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

We claim:

1. A machine tool, comprising
a. a storage magazine,
b. a base providing a vertical pivot,
c. a plurality of discs mounted one above the other for independent rotation about the pivot, each disc having a plurality of compartments located on its periphery for the storage of tools,
d. a housing having a rotatable spindle,
e. first transfer means located at a first position adjacent the magazine to convey a tool from a compartment for use by the spindle,
f. a second transfer means located at a second position adjacent the magazine, and
g. means provided to locate at the first position a compartment of one disc, which compartment contains a tool to be advanced next to the spindle and to locate at the second position an empty compartment of another disc to receive a tool that is about to be received from the spindle by the second transfer means.

2. A machine tool, comprising
a. a housing having a rotatable spindle,
b. a storage magazine remote from the spindle having a plurality of compartments,
c. a plurality of tool modules adapted to be stored in the compartments in a random manner, each module having a plurality of tool spindles extending in one direction and an input drive shaft extending in another direction,
d. means extending from the magazine to the spindle for transferring a module from a compartment of the storage magazine to the spindle and subsequently returning it to the magazine,
e. means provided at the spindle for supporting the module without rotation, for advancing it in the direction of the tool spindle axes, and for rotating the input drive shaft for rotation of the tool spindles, the module and a spindle housing being provided with a circular array of complementary gear teeth for accurately aligning the shaft and spindle axes, and
f. a flanged ring on the module and a reciprocable collet surrounding the spindle for grasping the flanged ring and drawing the module toward the spindle.

3. A machine tool, comprising
a. a conveyor loop adapted to support and move tool modules seriatim in one direction,
b. a spindle located adjacent the loop to receive the tool modules one at a time from an ordered queue line,
c. a random storage magazine located adjacent the loop to receive the tool modules one at a time after they leave the spindle, and
d. a bypass conveyor extending across the loop from a point on the loop between the spindle and the magazine to a point on the loop between the queue line and the spindle for the introduction to the head of the queue line of a particular queue line that is to be used again on the spindle soon after it has left the spindle.

4. A machine tool, comprising,
a. a housing having a rotatable spindle,
b. a magazine having a plurality of compartments for the storage of tools,
c. a queue line extending between the magazine and the spindle for presenting the tools seriatim to the spindle,
d. transfer means extending between the magazine and the queue line to convey the tools one-at-a-time from the magazine to the queue line, and
e. means connected to the transfer means operative on occasion to inhibit the transfer of new tools to the queue line and to convey an old tool which has just been used at the spindle to the end of the queue line.

5. A machine tool as recited in claim 4, wherein the old tool is transferred from the spindle back to the magazine and immediately from the magazine to the queue line by the transfer means.

6. A machine tool, comprising
a. a housing having a rotatable spindle,
b. a storage magazine remote from the spindle and having a plurality of compartments, c. a plurality of tool modules adapted to be stored in the compartments in a random manner, each module having tool spindle means extending in one direction and an input drive shaft extending in another direction,
d. a queue line close to the spindle for the ordered storage of modules,
e. transfer means extending between the magazine and the queue line for conveying a module from the magazine to the queue line,
f. conveyor means mounted on the queue line for advancing the module along the queue line to the rotatable spindle, and
g. return means extending from the spindle to the magazine for returning the module from the spindle to the magazine.

7. A machine tool as recited in claim 6, wherein the queue line presents the modules seriatim to the spindle, wherein the transfer means conveys the modules one at a time to the queue line, and wherein means is operative on occasion to inhibit the transfer of new modules to the queue line and to convey an old module which has just been used at the spindle to the end of the queue line.

8. A machine tool as recited in claim 6, wherein the storage magazine comprises a base having a vertical pivot and a plurality of discs mounted one above the other for independent rotation about the pivot, and wherein each disc is provided with a plurality of compartments located on its periphery for the storage of modules.

9. A machine tool as recited in claim 6, wherein electronic data processing means is provided for retaining information as to the particular empty compartment to which a particular module is returned and using that information later on to transfer the same module again to the queue line.

10. A machine tool, comprising
a. a housing having a rotatable spindle,
b. a storage magazine having a plurality of compartments,
c. a plurality of tool modules adapted to be stored in the compartments, each module having a plurality of tool spindles extending in one direction and an input drive shaft extending in another direction, each module being provided with a flanged ring and the spindle being surrounded by a reciprocable collet for grasping the flanged ring and drawing the module toward the spindle,
d. means for transferring a module from a compartment of the storage magazine to the spindle and subsequently returning it to the magazine, and
e. electronic data processing means for retaining the information as to the particular empty compartment to which a particular tool module is returned and using that information later to transfer the tool module again to the spindle, the electronic data processing means containing at a given time the exact information as to the whereabouts of every tool module associated with the machine tool.

11. A machine tool, comprising
a. a housing having a rotatable spindle,
b. a storage magazine having a plurality of compartments located adjacent the housing,
c. a plurality of tool modules stored in the compartments, each module having a plurality of tool spindles extending in one direction and an input drive shaft extending in another direction,
d. means extending from the storage magazine to the spindle for transferring a module from a compartment of the storage magazine to the spindle and subsequently returning it at random to an empty compartment of the magazine,
e. electronic data processing means operatively connected to the storage magazine for retaining the information as to the particular empty compartment to which that particular tool is returned and using that information later to transfer the tool again to the spindle, the electronic data processing means containing at a given time the exact information as to the whereabouts of every tool associated with the machine tool,
f. relatively delicate, but accurate means for connecting the input drive shaft to the spindle and located on the drive shaft and spindle, and
g. relatively strong, but inaccurate means for also connecting the shaft to the spindle and located on the drive shaft and spindle.

12. A machine tool, comprising
a. a housing having a rotatable spindle,
b. a magazine remote from the spindle and having a plurality of compartments for the random storage of tools, the storage capacity being relatively large,
c. a queue storage means extending between the magazine and the spindle for the ordered storage of tools, the storage capacity being relatively small, but containing at least two tools,
d. a conveyor for moving a tool from the magazine to the queue storage means and extending therebetween,
e. means mounted on the conveyor for advancing the tool along the queue storage means to the rotatable spindle, and
f. means extending between the spindle and magazine independent of the queue storage means for returning the tool directly to the magazine.

13. A machine tool as recited in claim 12, wherein each of the tools is a module having a plurality of tool spindles extending in one direction and an input drive shaft extending in the other direction.

14. A machine tool, comprising
a. a housing having a rotatable spindle,
b. a storage magazine remote from the spindle having a plurality of compartments,
c. a plurality of tool modules stored in the compartments in a random manner, each module having a plurality of tool spindles extending in one direction and an input drive shaft extending in another direction,
d. means extending from the magazine to the spindle for transferring a module from a compartment of the storage magazine to the spindle and subsequently returning it to the magazine,
e. means provided at the spindle for supporting the module without rotation, for advancing it in the direction of the tool spindle axes, and for rotating the input drive shaft for rotation of the tool spindles,
f. relatively delicate, but accurate means located on the drive shaft and spindle for connecting the input drive shaft to the spindle, and
g. relatively strong, but inaccurate means located on the drive shaft and spindle for also connecting the shaft to the spindle.

* * * * *